United States Patent
Andou et al.

(10) Patent No.: US 7,122,807 B2
(45) Date of Patent: Oct. 17, 2006

(54) CASSETTE READING PROCESSING DEVICE, CASSETTE READING PROCESSING METHOD AND CASSETTE

(75) Inventors: Masakazu Andou, Hino (JP); Mamoru Umeki, Hachioji (JP)

(73) Assignee: Konica Minolta Medical & Graphic Inc., Tokyo (JP)

( * ) Notice: Subject to any disclaimer, the term of this patent is extended or adjusted under 35 U.S.C. 154(b) by 0 days.

(21) Appl. No.: 10/952,461

(22) Filed: Sep. 28, 2004

(65) Prior Publication Data
US 2005/0072938 A1   Apr. 7, 2005

(30) Foreign Application Priority Data

| Oct. 2, 2003 | (JP) | 2003-344441 |
| Oct. 7, 2003 | (JP) | 2003-347738 |
| Oct. 15, 2003 | (JP) | 2003-354918 |

(51) Int. Cl.
*G03B 42/02* (2006.01)
(52) U.S. Cl. .................. 250/484.4; 250/584
(58) Field of Classification Search ............ 250/484.4, 250/584
See application file for complete search history.

(56) References Cited

U.S. PATENT DOCUMENTS

| 4,891,527 A * | 1/1990 | Rabatin ................. 250/483.1 |
| 4,944,026 A | 7/1990 | Arakawa et al. |
| 4,961,000 A | 10/1990 | Finkenzeller et al. |
| 5,446,779 A | 8/1995 | Ohta et al. |
| 5,475,230 A | 12/1995 | Stumpf et al. |
| 6,969,861 B1 * | 11/2005 | Shoji et al. ............ 250/484.4 |
| 7,005,655 B1 * | 2/2006 | Stahl et al. ............ 250/484.4 |
| 2002/0060303 A1 | 5/2002 | Yonekawa |
| 2003/0123613 A1 | 7/2003 | Evans et al. |
| 2004/0041099 A1 * | 3/2004 | Gebele et al. ........... 250/484.4 |
| 2004/0089826 A1 | 5/2004 | Yonekawa |
| 2004/0094732 A1 | 5/2004 | Yonekawa |
| 2004/0124368 A1 * | 7/2004 | Struye et al. ............ 250/484.4 |

FOREIGN PATENT DOCUMENTS

BE   EP 03102341.9   * 7/2003

(Continued)

OTHER PUBLICATIONS

Leblans, Paul et al., "A New Needle-Crystalline Computed Radiography Detector" Session 3B: Digital Imaging and Computer-Aided Diagnosis, Journal of Digital Imaging, vol. 13, No. 2, Suppl May 1, 2000: pp. 117-120, XP 001120156, ISSN: 0897-1889.

Primary Examiner—Renee Luebke
Assistant Examiner—Mary Zettl
(74) Attorney, Agent, or Firm—Frishauf, Holtz, Goodman & Chick, P.C.

(57) ABSTRACT

A cassette to record a radiation image of an object to be radiographed, is provided with a sheet-shaped recording medium including a layer of needle imaging plate having a thickness of 20 μm to 2 mm, wherein the needle imaging plate are formed by a deposition method; a front member through which the recording medium receives the radiation image of the object; and a back member positioned opposite to the front member; wherein the front and back members are relatively attached to each other so as to form an accommodation space in which the sheet-shaped recording medium is accommodated or detached from each other and the attaching or detaching direction of the front and back members is substantially the same direction with a growing direction of the needle imaging plate.

21 Claims, 19 Drawing Sheets

FOREIGN PATENT DOCUMENTS

| | | |
|---|---|---|
| EP | 1 391 749 A1 | 2/2004 |
| EP | 1 391 780 A1 | 2/2004 |
| GB | 1 444 161 | 7/1976 |
| JP | 05-313267 | 11/1993 |
| JP | 07-120854 | 5/1995 |
| JP | 11-271895 A | 10/1999 |
| JP | 2000-275763 A | 10/2000 |
| JP | 2002-156716 | 5/2002 |

* cited by examiner

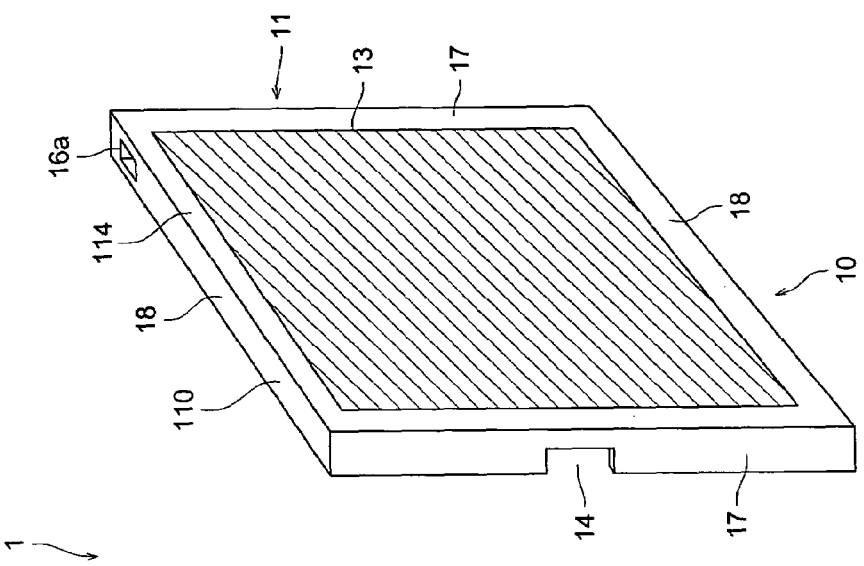
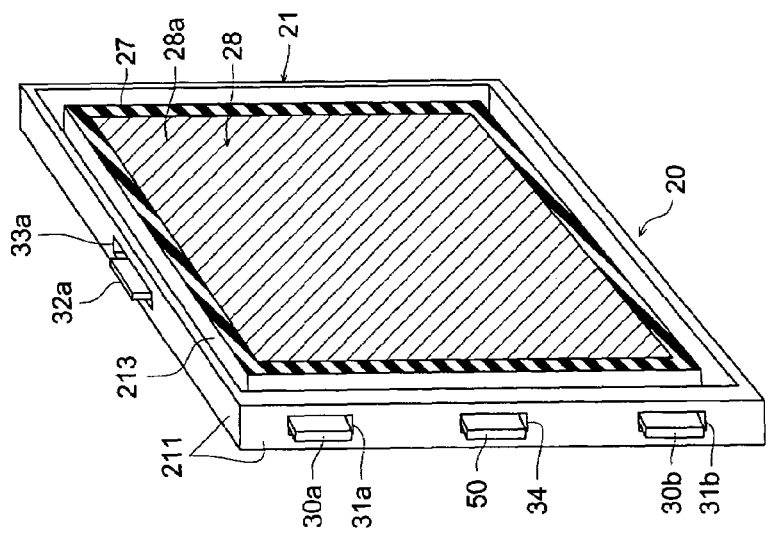

FIG. 6 (A)
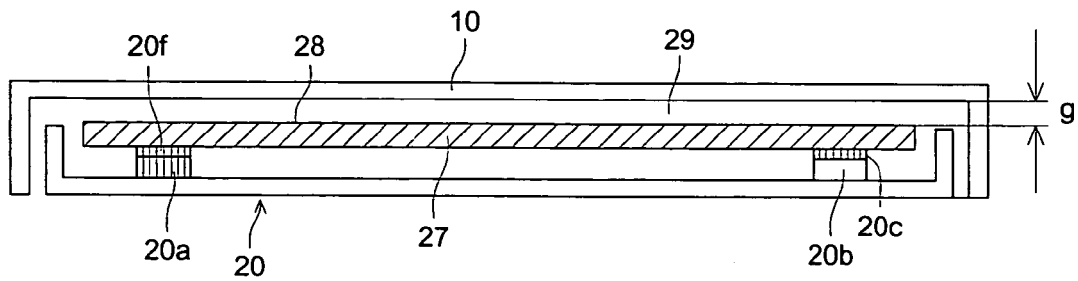
FIG. 6 (B)
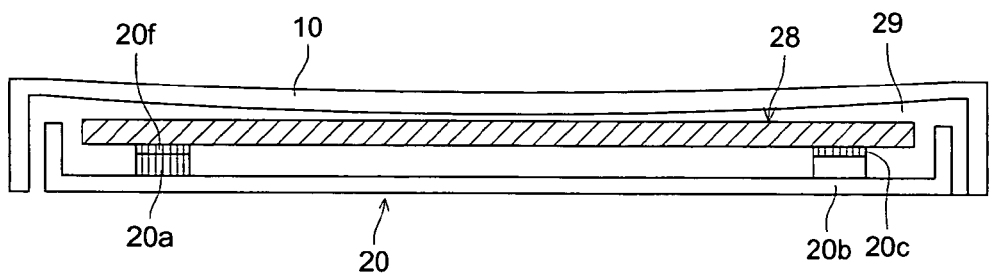
FIG. 6 (C)
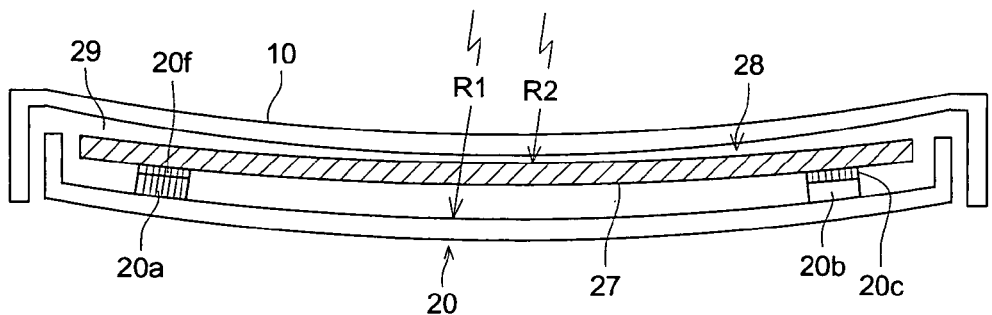
FIG. 6 (D)   FIG. 6 (E)
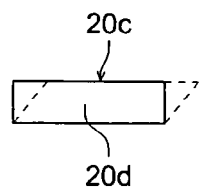 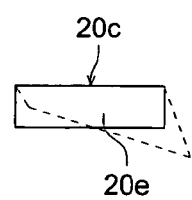

FIG. 6 ( F )
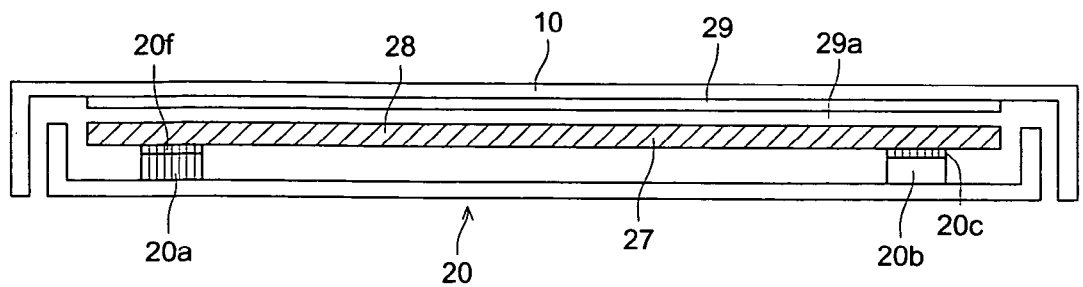
FIG. 6 ( G )
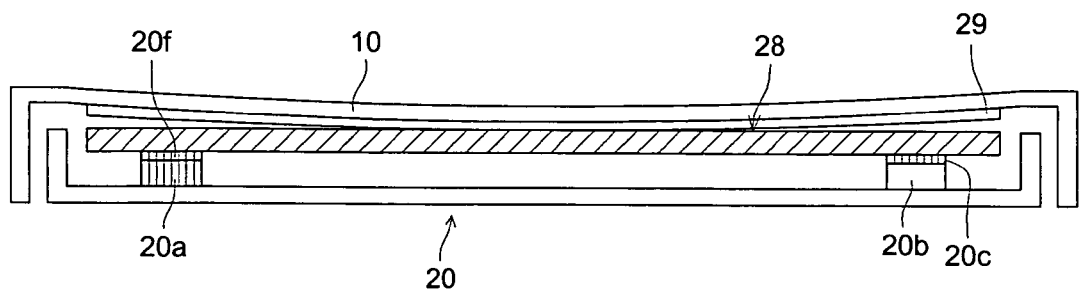
FIG. 6 ( H )
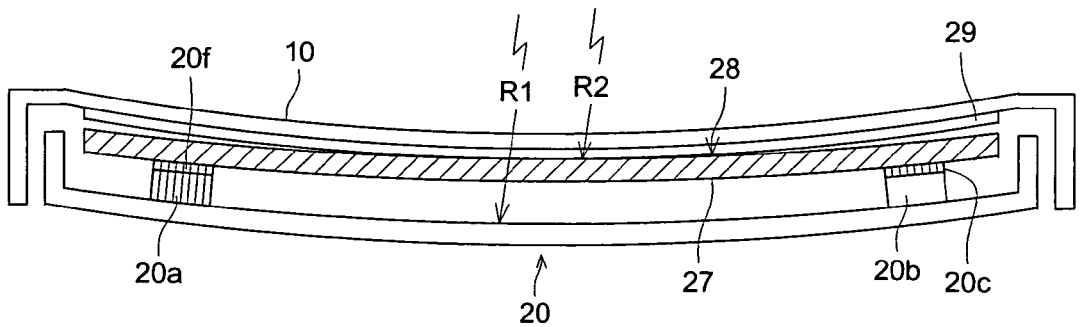

CASSETTE READING PROCESSING DEVICE, CASSETTE READING PROCESSING METHOD AND CASSETTE

BACKGROUND OF THE INVENTION

The present invention relates to a cassette reading processing device by which the reading processing of the image information is conducted on a cassette in which an accumulative phosphor appropriate for the radiation photography is accommodated, a cassette reading processing method and a cassette.

Conventionally, a cassette in which a radiation image photography is conducted on the cassette in which the accumulative phosphor is accommodated, and from the accumulative phosphor after the photographing, the radiation image is read, is used for the medical care (refer to the following Patent Documents 1 to 6). In such a conventional cassette, as the accumulative phosphor, for example, powder imaging plate BaFI phosphor is used.

As a cassette structure using the powder imaging plate (BaFI) phosphor, as shown in the following, various methods are put in practical use. In the following Patent Document 1, a part of the cassette leading edge part is opened, and a method in which a flexible recording medium is taken out by a suction cup, is adopted. In the following Patent Document 2, in the same cassette structure as the above Patent Document 1, a method in which a recording medium whose rigidity is assumed to be high, is conveyed by a roller, is adopted. In the following Patent Document 3, a method in which a front plate is entirely opened around a hinge, is adopted.

Further, in the following Patent Document 4, a detachable type cap and the recording medium whose rigidity is comparatively high are integrated, and a structure in which the recording medium is taken in and out to the cassette main body, is adopted. In the following Patent Document 5, a structure in which the front plate and the back plate are perfectly separated, and the combination of both is conducted by the opening and closing of a mechanical lock means, is adopted. In the following Patent Document 5, a structure in which the front plate and the back plate are perfectly separated, and the combination of both is conducted by an attraction force of the magnet and the separation of both is conducted by the deflection, is adopted.

The powder imaging plate phosphor is not a big problem from the view point of the maintenance of the image quality or durability (deterioration of the image quality), even when any structure of the various cassette structures as described above, is adopted.

Further, in the cassette of the following Patent Document 2, there is an description that a non-woven fabric as the cushioning material is pasted on the plate section opposite to the image recording layer of the radiation image recording medium, and because the non-woven fabric is not frayed, there is no case where it becomes a dust and an image defect is caused, however, in practice, there is a possibility that, when the recording medium is inserted into the cassette, the non-woven fabric is cut by an edge of the recording medium and dusts are generated, and there is a problem that, depending on the repeated use, dusts are generated, and the image defects are produced.

On the one hand, recently, to the powder imaging plate phosphor, the phosphor is remarked from the view point that the phosphor in which a needle imaging plate is grown to a predetermined thickness by the deposition method(deposition method), can obtain the high sensitivity. In the needle imaging plate by the deposition method, the present inventors and so on find a fact that, when the film thickness is a thin film of nm (nano-micron) level, the strength of the phosphor is equal to that of the powder imaging plate (coating type) one, however, for the purpose that the phosphor having an advantage of the high sensitivity is put into a practical use to the CR system, a certain degree-of film thickness is necessary, and when the needle imaging plate (column crystal) by the deposition method (vapor phase growing-up method) becomes thick, it becomes fragile, and a damage is easily subjected by the external force. Accordingly, it is not preferable that the external force is added to the recording medium, it is deformed or the impact force is received, while it is transferred or at the time of operation of photographing, and it is also not preferable that, when the photographing is completed and the recording medium is taken from the cassette, and after reading of the image information is completed, it is inserted (into the cassette) again, the impact force is given to the recording medium.

For example, there is a case where, for an inspection and photographing in the hospital, a patient on a bookie-table or a bed is radiation-photographed, and in this case, under a condition that the patient lies down on a comparatively soft material such as bedclothes which are not rigid, because the cassette is inserted between this soft material and the patient, at the time of photographing, the cassette is going to be 3-dimensionally deformed by the body weight of the patient, and after the photographing is completed and when the load onto the cassette is released, the cassette is going to return to the original. Every time when the photographing is repeated, the above-described movement is repeated. Further, even when the cassette is put on a comparatively rigid table, there is a case where the front plate is deflected by the load of the patient applied on the front plate, and an external force is given to the recording medium surface in the cassette, and it is an important problem for the recording medium formed of the needle imaging plate by the deposition method as described above.

| | |
|---|---|
| (Patent Document 1) | Tokkai 2000-275763 |
| (Patent Document 2) | Tokkaihei 05-313267 |
| (Patent Document 3) | Tokkaihei 07-120854 |
| (Patent Document 4) | Tokkaihei 11-271895 |
| (Patent Document 5) | Tokkai 2002-156716 |
| (patent Document 6) | U.S. Patent Specification 4,961,000 |

SUMMARY OF THE INVENTION

In view of problems of the conventional technology as described above, the object of the present invention is to provide a cassette having a cassette structure optimum for the recording medium formed of a needle imaging plate grown by the deposition method.

Further, the object of the present invention is to provide a cassette reading processing device and a cassette reading processing method, by which the handling characteristics of the image reading optimum for the cassette in which the recording medium formed of a needle imaging plate which is grown by the deposition method is accommodated can be realized.

In order to attain the above objects, as the result of the research and consideration, the present inventors and so on find the knowledge that, to put the phosphor formed of the needle imaging plate by the deposition method into practical use as the recording medium, it is necessary that its film thickness is about 20 μm–2 mm, on the one hand, when the thickness of the needle imaging plate by the deposition method is in the range of 20 μm–2 mm, it is fragile against the external force such as bending or impact, particularly, to the growth direction of the needle imaging plate, when the external force is applied to the direction almost perpendicular to the growth direction, it becomes easily fragile, and further, the present inventors and so on have the knowledge that, generally, it is considered that smaller the distance between the recording medium and the front member is, the better quality of image is, however, in the consideration of the CR system by the present inventors and so on, when the distance is more than 2 mm, the image quality is deteriorated, and the present invention is attained based on such a knowledge.

A cassette according to the present invention is characterized in that: the cassette is structured by the front member and the back member, and in which the sheet-like recording medium which is formed of the needle imaging plate formed by the deposition method and whose thickness is within the range of 20 μm to 2 mm, is accommodated, and the front member and the back member are relatively detachably structured in almost the same direction as the growth direction of the needle imaging plate, and the distance between the front member and the recording medium is 0.5 to 2 mm, and the cassette is structured also by an always non-contact cushioning member is arranged between the front member and the recording medium.

According to this cassette, the front member and the back member are, for example, for the reading of image information, relatively detachable, in almost the same direction as the growth direction of the needle imaging plate by the deposition method whose thickness is within the range of 20 μm to 2 mm, constituting the sheet-like recording member, and even when, by such a putting-on and taking-off, a case where the external force is applied on the sheet-like recording medium, is caused, because the force is applied in almost the same direction as the growth direction of the needle imaging plate, the needle imaging plate is hardly broken. Further, even when the external force is going to be affected on the recording medium in the cassette from the front member side, because there is a distance between the front member and the recording medium, the external force is hardly applied on the needle imaging plate of the recording medium, the needle imaging plate is hardly broken. Therefore, even when the external force is applied on the cassette when the cassette is carried or the patient laying in bed is radiation-photographed by the cassette, the bad influence on the needle imaging plate can be prevented. Further, when the distance between the recording medium and the front member is more than 0.5 mm, the non-contact of both can be assuredly maintained, and when it is less than 2 mm, the image quality is not deteriorated.

According to this cassette, because the front member and the back member are relatively detachable, for example, for reading of the image information, in almost the same direction as the growth direction of the needle imaging plate whose thickness is in the range of 20 μm to 2 mm, by the deposition method, and even when a case where the external force is applied on the sheet-like recording medium by such a detachable motion, is generated, because the external force is applied in almost the same direction as the growth direction of the needle imaging plate and the cushioning member is arranged between the front member and the recording medium, and the impact by the external force can be absorbed and softened, the needle imaging plate is hardly broken. Further, because the cushioning member is always non-contact with the recording medium, the peel charging is hardly generated when the recording medium is taken out, and there is no case of suction of dust by the static electricity, and dusts are not generated from the cushioning member itself, and the stress is not applied on the recording medium, and the problem such as the breakage and damage of the recording medium can be prevented.

In this manner, the cassette having the optimum cassette structure by which the stress is least applied on the recording medium formed of the needle imaging plate grown by the deposition method, can be realized.

In the above cassette, it is preferable that the sheet-like recording medium has the sheet-like image recording section which is crystal-grown in the direction almost perpendicular to the sheet surface by the deposition method on the a single surface of the rectangular sheet, and on the opposite surface of the sheet-like image recording section, the sheet-like recording medium is integrated with the back member side, and the front member is detachably structured to the back member and the sheet-like recording medium. Hereby, because the sheet-like recording medium is integrated with the back member side on the opposite surface of the needle imaging plate by the deposition method, the bad influence by the integration on the sheet-like image recording section is hardly generated.

Further, it is preferable that the back member and the sheet-like recording medium are combined relatively movably. Hereby, even when the cassette or the back member is deformed by the external force, because the sheet-like recording medium moves to the back member, the transmission of the external force is softened. Hereby, the recording medium using the needle imaging plate grown by the deposition method is hardly broken.

Further, it is preferable that a gap between the recording medium and the front member is in the range of 0.5 to 2 mm, and the cushioning member is thinner than the gap. When the gap between the recording medium and the front no stress is transferred member is more than 0.5 mm, the non-contact of the cushioning member can be comparatively easily maintained, and when it is less than 2 mm, the image quality is not deteriorated. Further, it is preferable that the cushioning member is formed of non-woven fabric.

Further, it is preferable that the holding member formed of the cushioning material is arranged so that the recording medium is held in the cassette, and by the holding member, it is structured so that the recording medium is positioned in the periphery of the cassette external shape end portion. Hereby, because the impact by external force can be absorbed and softened by the holding member formed of the cushioning material, the needle imaging plate is hardly broken. Further, because the recording medium is positioned by the holding member formed of the cushioning material, and the impact force is softened, a dislocation of the recording medium can be effectively prevented.

In this case, an object of positioning of the recording medium may be either one of the back member or the front member.

That is, the cassette reading processing device of the present invention is a cassette reading processing device in which, on a cassette which is structured by the front member and the back member, and the sheet-like recording medium having the recording section formed of a needle imaging plate which is formed by the deposition method, and whose thickness is in the range of 20 μm to 2 mm, is accommodated, and is integrated with the back member on the opposite surface of the recording section, and the front member and the back member are structured relatively compatible in the almost same direction as the growth direction of the needle imaging plate, and the distance between the front member and the recording medium is defined to be 0.5 to 2 mm, and the front member and the back member are integrally combined by a lock means, the reading processing of the image information is conducted from the recording medium, and which is characterized in that: it has a cassette holding rotation means for holding the cassette and rotating it in the device, and an absorption means for absorbing the cassette rotated by the cassette holding rotation means, on the back member side for the reading processing, and after the cassette holding rotation means brings the cassette into contact with the absorption means on the back member side and further rotates it by a predetermined amount, it releases the lock means, and separates the front member of the cassette from the back member.

According to this cassette reading processing device, when the cassette is absorbed by the absorption means on the back member side, because the cassette is brought into contact with the absorption means and is further rotated by a predetermined amount, the back member integrated with the recording medium can be assuredly absorbed by the absorption means, and held. Therefore, because, at the time of sub-scanning when the image information is read from the recording medium, the distance between subject and image can be assured, the image is stable. When the cassette is brought into contact with the absorption means and further, is rotated by a predetermined amount at the time of such an absorption holding, corresponding to the contact condition of the back member surface with the surface of the absorption means, the back member can be pressed to the absorption means, however, even when the external force is going to affect on the recording medium in the cassette from the front member side at this time, because there is a certain distance between the front member and the recording medium, it is difficult that the external force is applied on the recording section of the needle imaging plate, and the needle imaging plate is hardly broken. Further, because the cassette can be assuredly held to the absorption means by the back member, and because the front member and the back member can be integrally combined by the lock means, the cassette position is always fixed, and there is no case where it is relatively free, and the cassette can be accurately positioned in the device. Further, at the time of reading processing, because the front member and the back member are relatively separated and combined in almost the same direction as the growth direction of the needle imaging plate, and even when a case where the external force is applied on the recording medium by such a separation and combination, is generated, because the force is applied in almost the same direction as the growth direction of the needle imaging plate, the needle imaging plate is hardly broken. Further, when the distance between the recording medium and the front member is more than 0.5 mm, the non-contact of both can be relatively easily maintained, and when it is less than 2 mm, the image quality is not deteriorated. In this manner, it becomes possible that the cassette in which the recording medium formed of the needle imaging plate grown by the deposition method is accommodated, is optimally handled in the reading processing device.

In the above-described cassette reading processing device, it is preferable that, when the cassette holding rotation means brings the cassette into contact with the absorption means, it can be moved by almost the same amount as the distance between the front member and the recording medium. Hereby, when the cassette is brought into contact with the absorption means, even when the front member is deformed, a possibility that the recording member is pressed, can be reduced.

Further, after the reading processing is completed, it is preferable that, after the front member is integrated with the back member, and locked by the lock means, the cassette is separated from the absorption means.

The cassette reading processing method of the present invention is a cassette reading processing method by which the recording processing of the image information is conducted from the recording medium, on the cassette which is composed of the front member and the back member, and in which a sheet-like recording medium having the recording section formed of the needle imaging plate which is formed by the deposition method, and whose thickness is in the range of 20 μm to 2 mm, is accommodated, and the front member is integrated with the back member on the opposite surface of the recording section, and the front member and the back member are structured so that they are relatively detachable in almost same direction as the growth direction of the needle imaging plate, and the distance between the front member and the recording medium is 0.5 to 2 mm, and the front member and the back member are integrally combined by the lock section, which is characterized in that: it includes; a step by which the cassette is held and rotated toward the absorption section; a step by which the rotated cassette is brought into contact with the absorption section on the back member side, and further, rotated by a predetermined amount; a step by which the lock section is released, and the front member of the cassette is separated from the back member; and a step by which the image information is read from the recording medium integrated with the back member which is absorbed by the absorption section.

According to this cassette reading processing method, when the cassette is absorbed by the absorption section on the back member side, because the cassette is brought into contact with the absorption section and further, rotated by a predetermined amount, the back member with which the recording medium is integrated, can be assuredly absorbed by the absorption section and held. Hereby, because, at the time of sub-scanning when the image information is read from the recording medium, a distance between subject and image can be assured, the image is stabilized. When the cassette is brought into contact with the absorption section and further rotated by a predetermined amount at the time of such a absorption and holding, corresponding to the contact condition of the back member surface with the absorption means surface, the over stroke can be conducted, however, even when the external force is going to be applied on the recording medium in the cassette from the front member side at this time, because there is a distance between the front member and the recording medium, the external force is hardly applied on the recording section of the needle imaging plate, and the needle imaging plate is hardly broken. Because the cassette can be assuredly held to the absorption section by the back member and the front member and the back member can be integrally combined by the lock section, the cassette position is always fixed in the device, and there is no case where it becomes relatively free, and the cassette can be accurately positioned in the device. Further, at the time of the reading processing, the front member and the back member are relatively separated and combined in the almost same direction as the growth direction of the needle imaging plate, and even when a case where the external force is applied on the recording medium by such a putting-on and taking-off, is generated, because it is applied in almost the same direction as the growth direction of the needle imaging plate, the needle imaging plate is hardly broken. Further, when the distance between the recording medium and front member is more than 0.5 mm, the non-contact of both can be comparatively easily maintained, and when the distance is less than 2 mm, the image quality is not deteriorated. In such a manner, the cassette in which the recording medium formed of the needle imaging plate grown by the deposition method is accommodated, can be optimally handled at the time of the reading processing.

In the above cassette reading processing method, when the cassette is brought into contact with the absorption section, it is preferable that the cassette is rotated by almost the same amount as the distance between the front member and the recording medium. Hereby, when the cassette is brought into contact with the absorption means, even when the front member is deformed, a possibility that the recording member is pressed can be reduced.

Further, after the step of the reading processing, it is preferable that, after the front member is integrated with the back member and locked by the lock section, the cassette is separated from the absorption section.

Another cassette reading processing device according to the present invention can be structured in such a manner that the reading processing is conducted on the above-described cassette in the above-described cassette reading processing device.

Another cassette reading processing method according to the present invention can be structured in such a manner that the reading processing is conducted on the above-described cassette by the above-described cassette reading processing method.

EFFECTS OF THE INVENTION

According to the cassette of the present invention, it is an optimum cassette structure for the needle imaging plate grown by the deposition method, and the influence of the external force acting on the cassette can be softened, and the generation of dusts which generates image defects can be suppressed. According to the cassette reading processing device and cassette reading processing method of the present invention, in view of the problems of the conventional technology as described above, the preset invention can realize the handling property of the image reading, optimum for the cassette in which the recording medium formed of the needle imaging plate grown by the deposition method is accommodated.

According to the cassette of the present invention, the preset invention can realize a cassette having a cassette structure, optimum for the recording medium formed of the needle imaging plate grown by the deposition method.

BRIEF DESCRIPTION OF THE PREFERRED EMBODIMENT

FIG. 1 is a perspective view showing a condition that the front member (A) and the back member (B) of the cassette for the radiation image photographing are separated;

FIGS. 2(A) and 2(B) are sectional views schematically showing the cross section of a cassette into which the front member and the back member of FIG. 1 are integrated, FIGS. 2(C) and 2(D) are sectional views schematically showing the cross section of a cassette having a cushioning member in a plane shape;

Figure 2A:
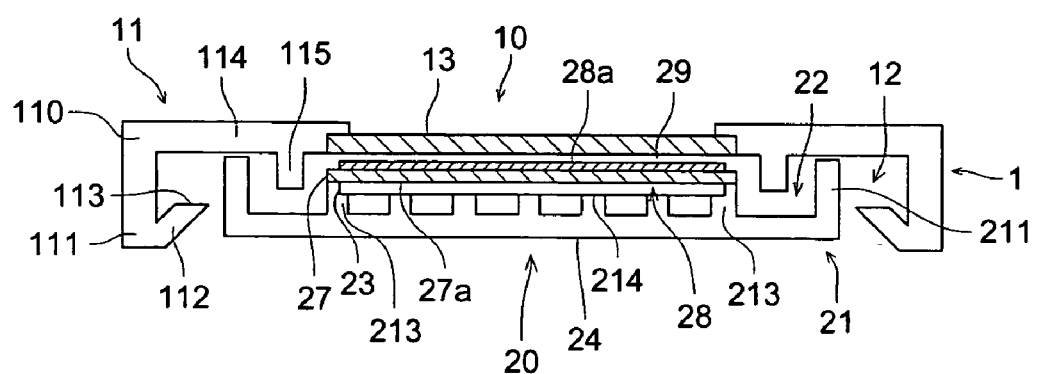
Figure 2B:
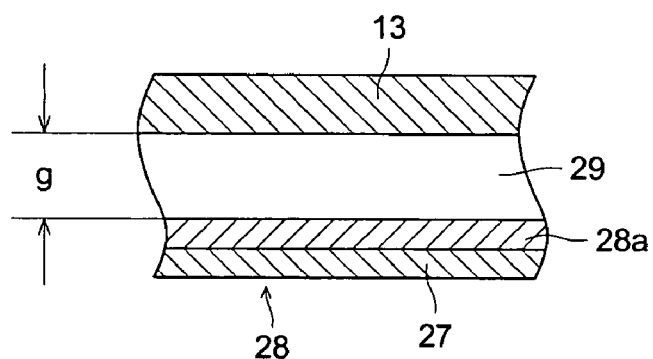
Figure 8:
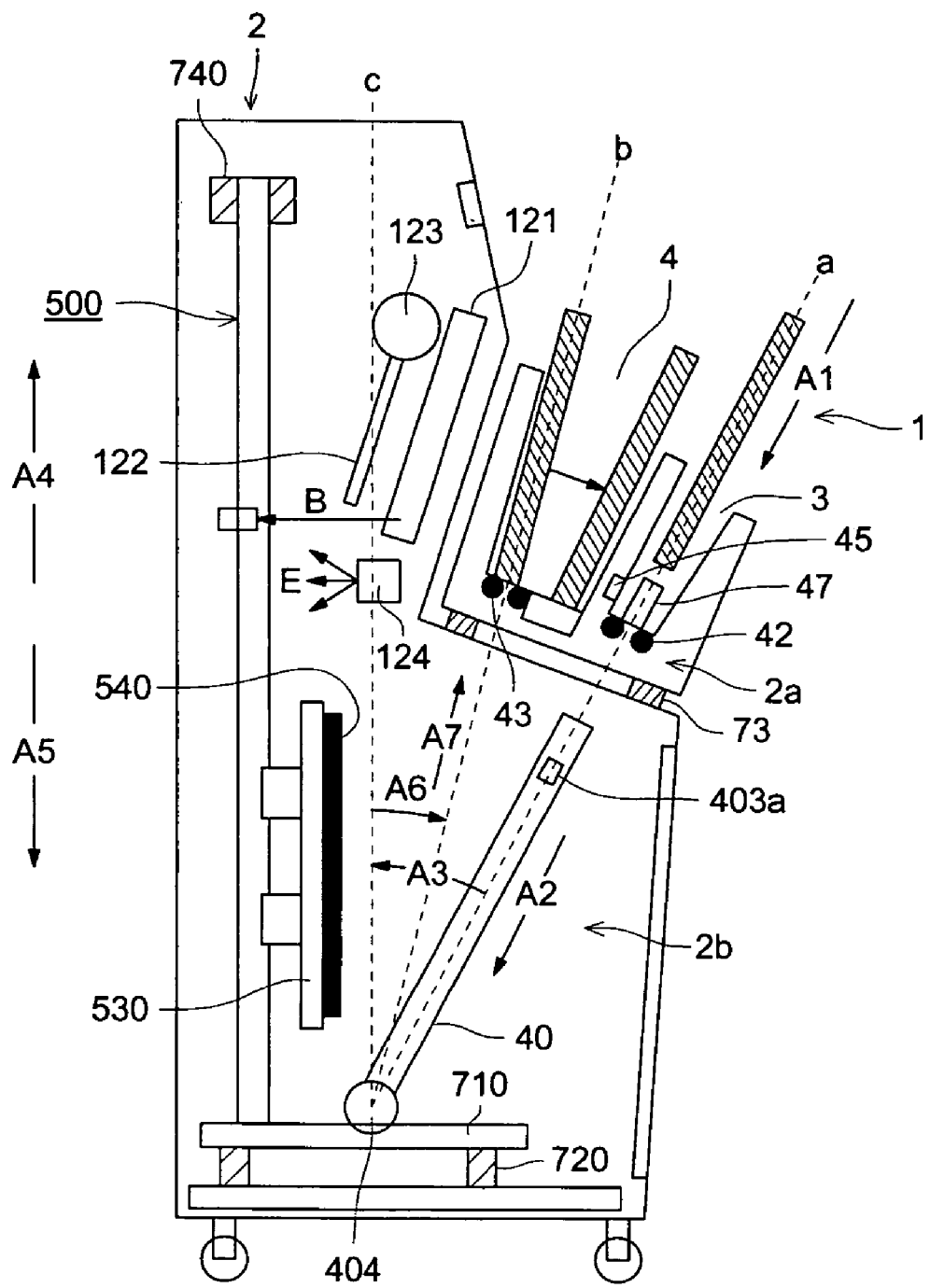

FIG. 6(A) is a sectional view showing a modified example of the cassette in FIG. 2(A), FIG. 6(B) is a sectional view showing a state where an external force is applied to the front member which is thereby deformed, FIG. 6(C) is a sectional view showing a state where an external force is also applied to the back member which is thereby deformed, FIG. 6(D) is a view schematically showing a state where a double-sided adhesive tape as a joining means in FIG. 6(C) is deformed, FIG. 6(E) is a view schematically showing a state where an elastic adhesive agent as a joining means in FIG. 6(C)is deformed, FIG. 6(F) is a sectional view showing a modified example of the cassette in FIG. 2(C), FIG. 6(G) is a sectional view showing a state where an external force is applied to the front member which is thereby deformed, FIG. 6(H) is a sectional view showing a state where an external force is also applied to the back member which is thereby deformed;

FIG. 7(A) is a sectional view (A) showing another modified example of the cassette shown in FIG. 2(A), FIG. 7(B) is a sectional view showing a state where an external force is applied on the back member which is thereby deformed, FIG. 7(C) is a sectional view showing still another modified example of the cassette shown in FIG. 2(C), FIG. 7(D) is a sectional view showing a state where external forces are applied to the front member and the back member which are thereby deformed;

FIG. 8 is a side view showing an outline structure of the cassette reading processing device by which the radiation image can be read from the cassette 1 for radiation image photographing of FIG. 1.

Figure 9:
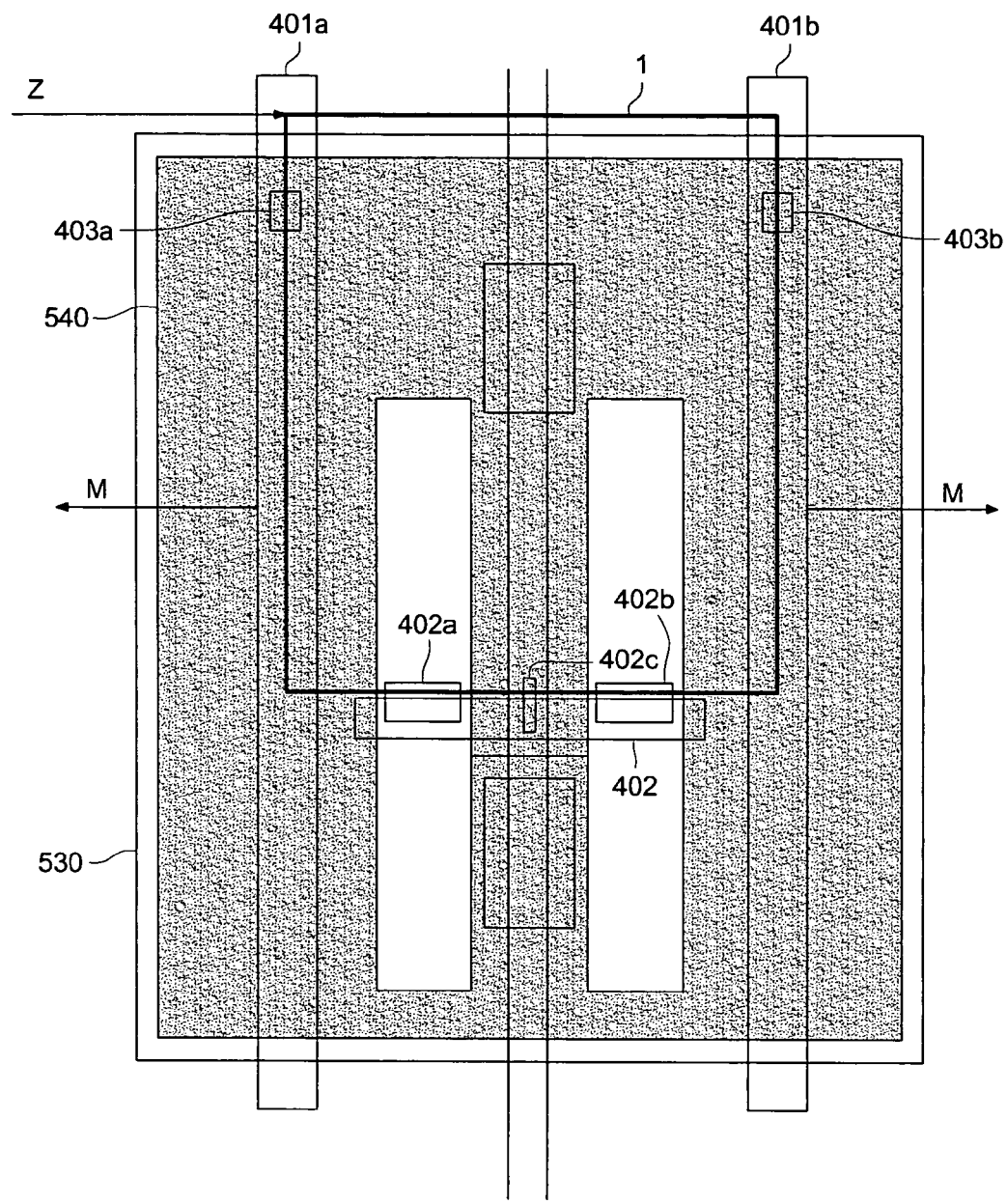

FIG. 9 is a schematic plan view of the cassette reading processing device of FIG. 8.

Figure 10:
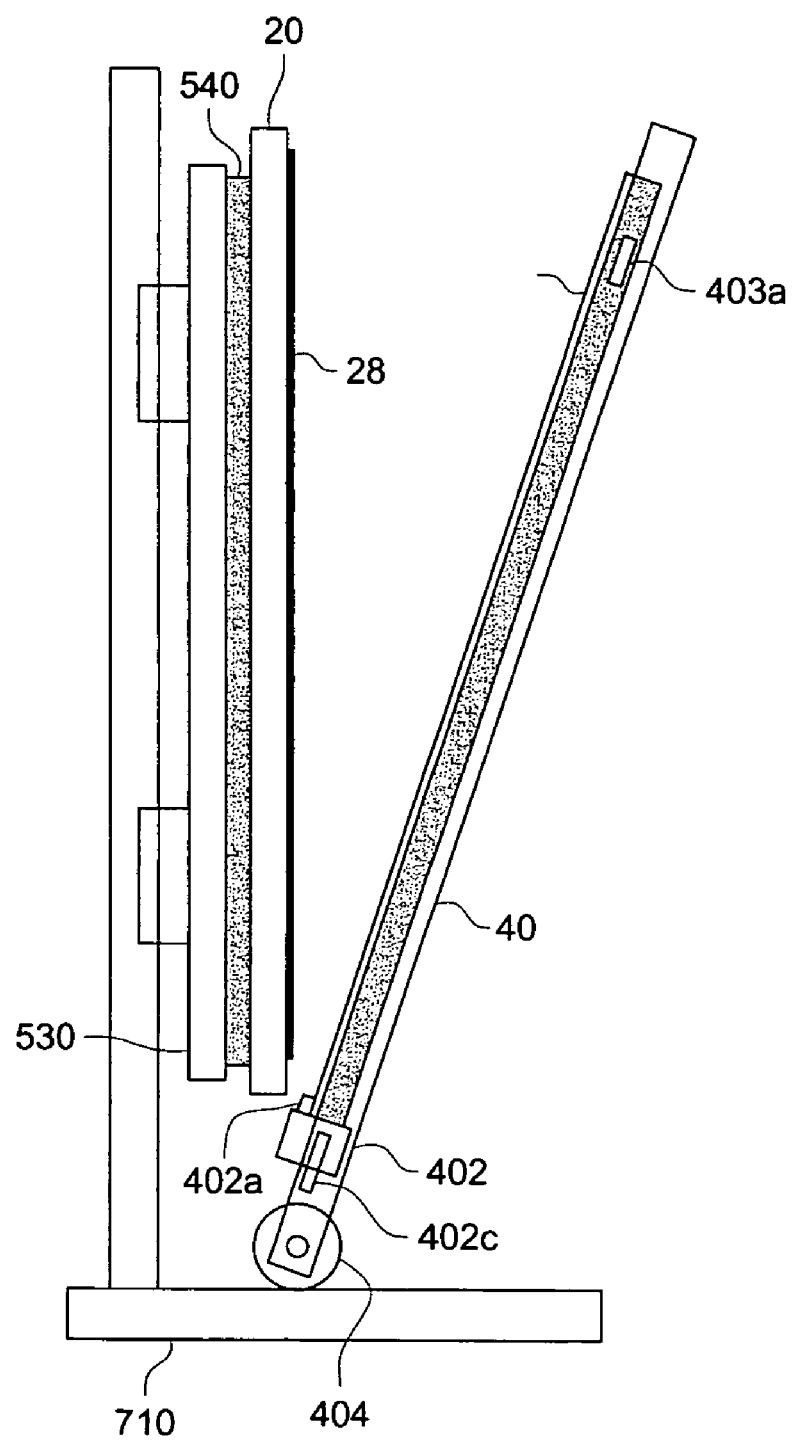

FIG. 10 is a main part side view for explaining a separation movement of the cassette of the cassette reading processing device of FIG. 8.

Figure 11:
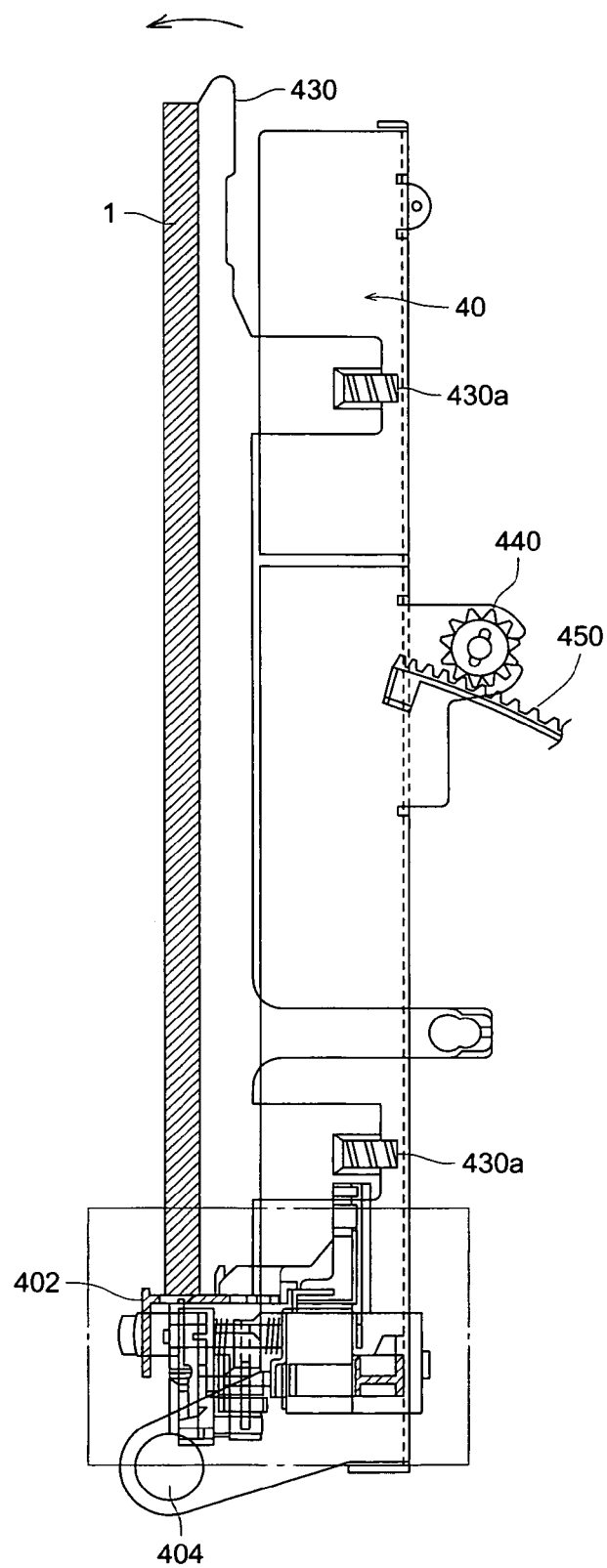

FIG. 11 is a side view for specifically explaining a rotation conveying section of FIG. 8.

Figure 2:
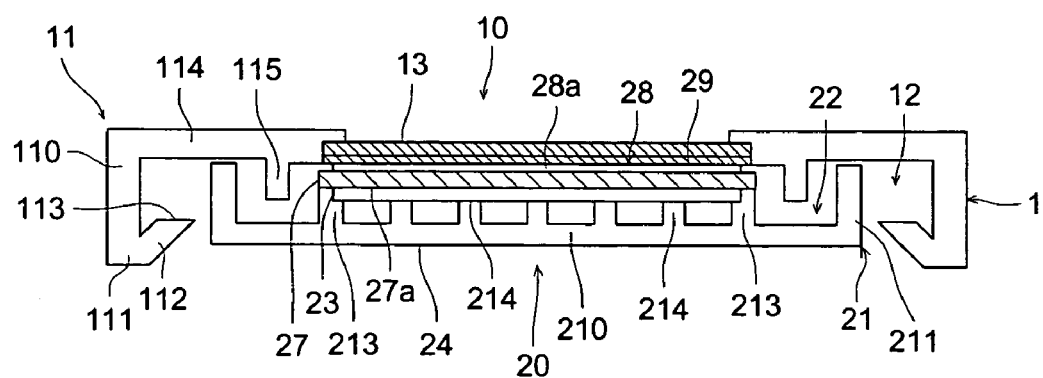
Figure 2:
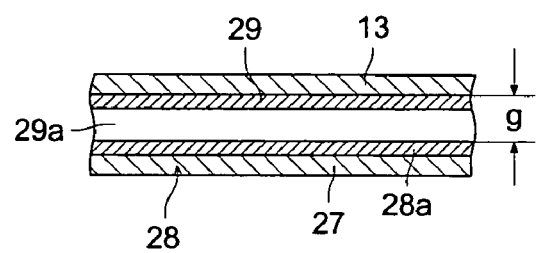
Figure 12:
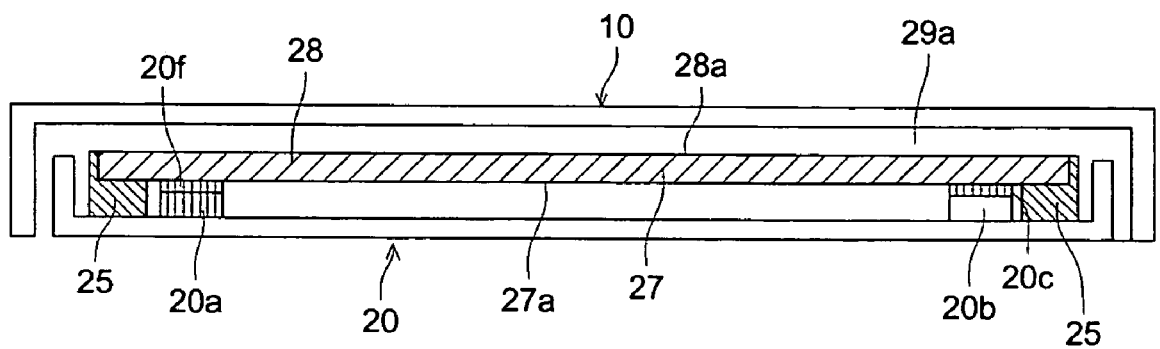

FIG. 12 is a sectional view showing yet another modified example in which a holding member formed of a cushioning material is arranged on the opposite surface side of the accumulative phosphor layer of the accumulative phosphor sheet in FIG. 1, FIG. 2.

Figure 13:
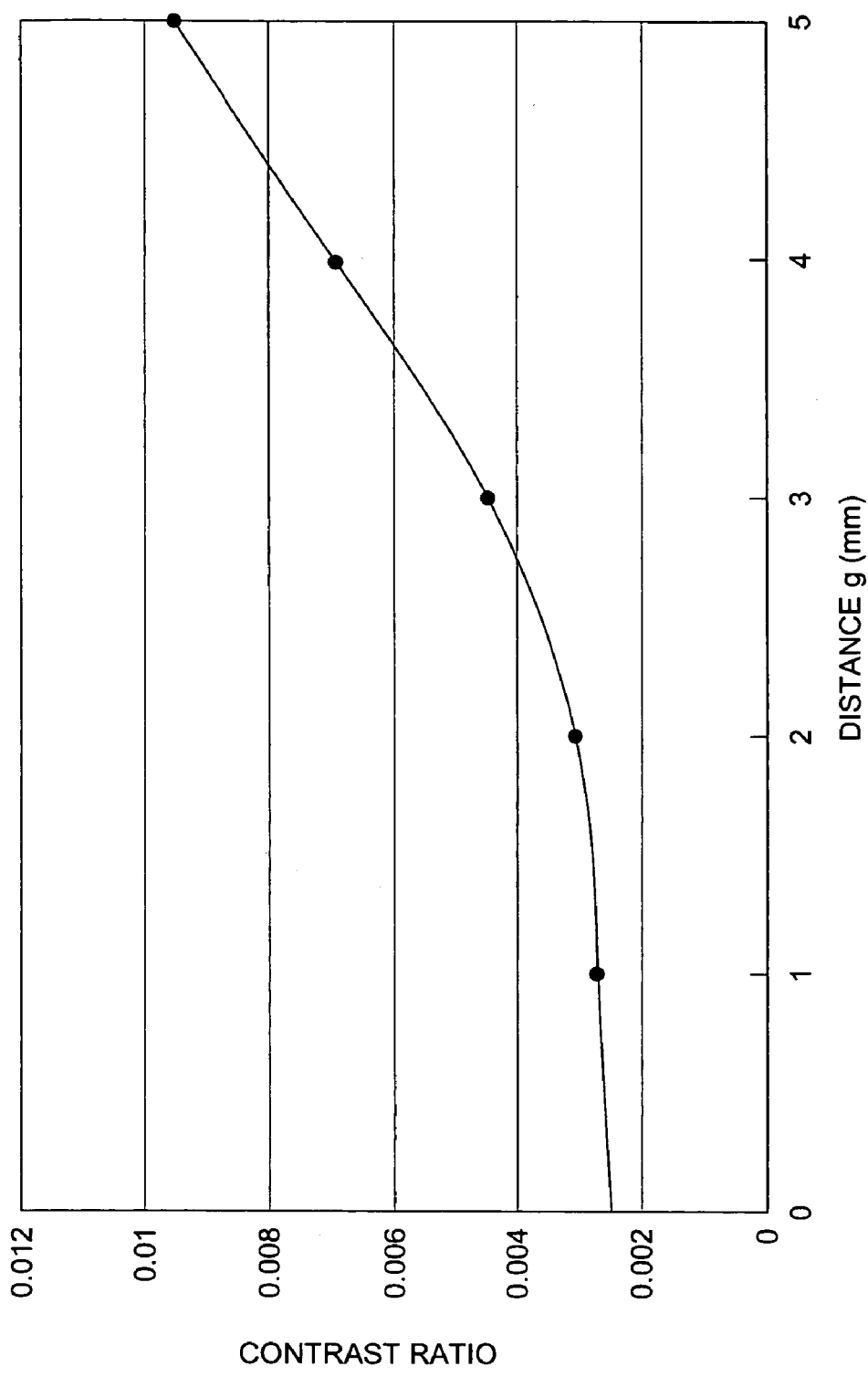

FIG. 13 is a view showing the result of a glare measurement by a lead disc (80 mm diameter) conducted for the cassette of the structure of FIG. 1, FIG. 2.

Figure 14:
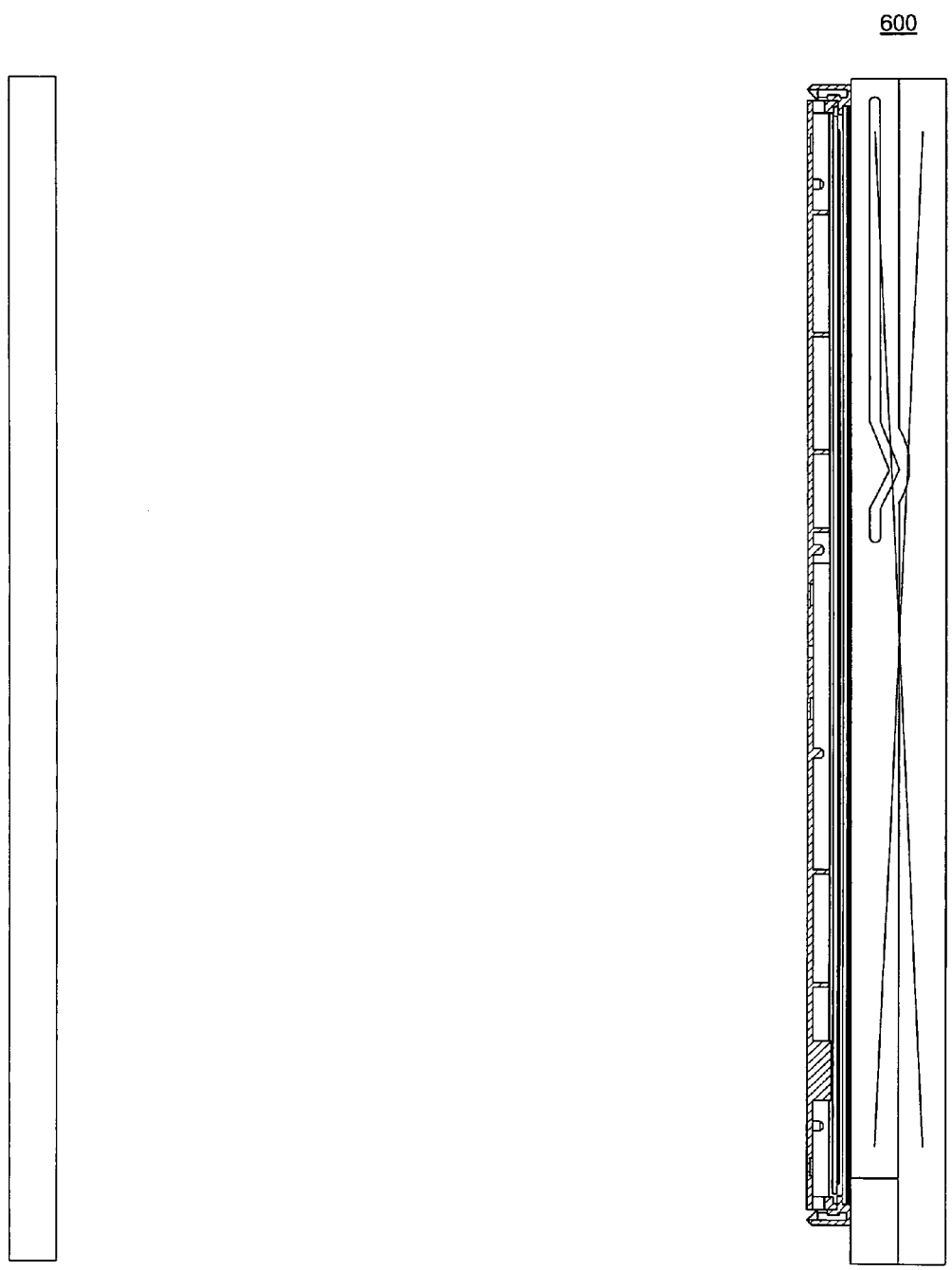
Figure 15:
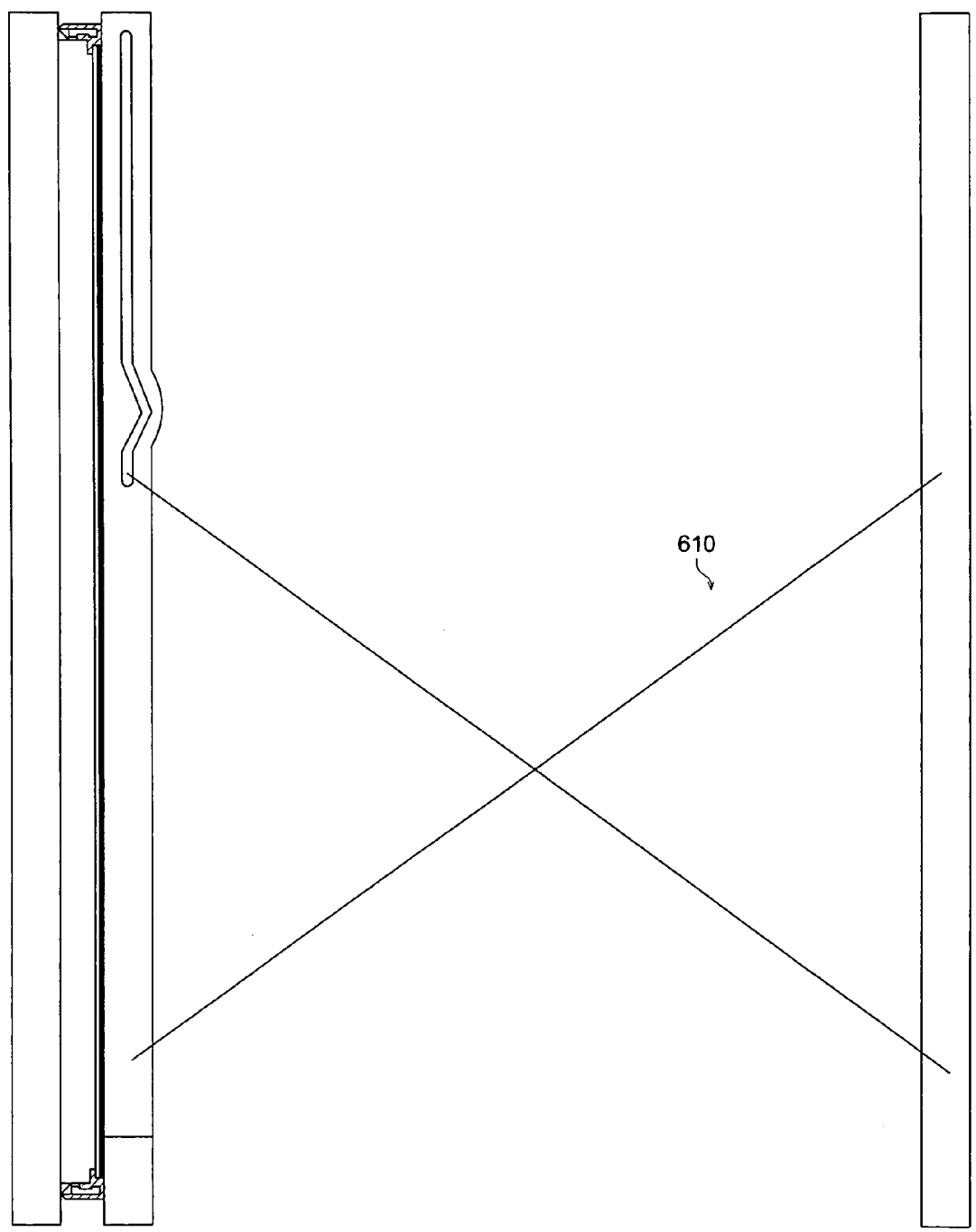
Figure 16:
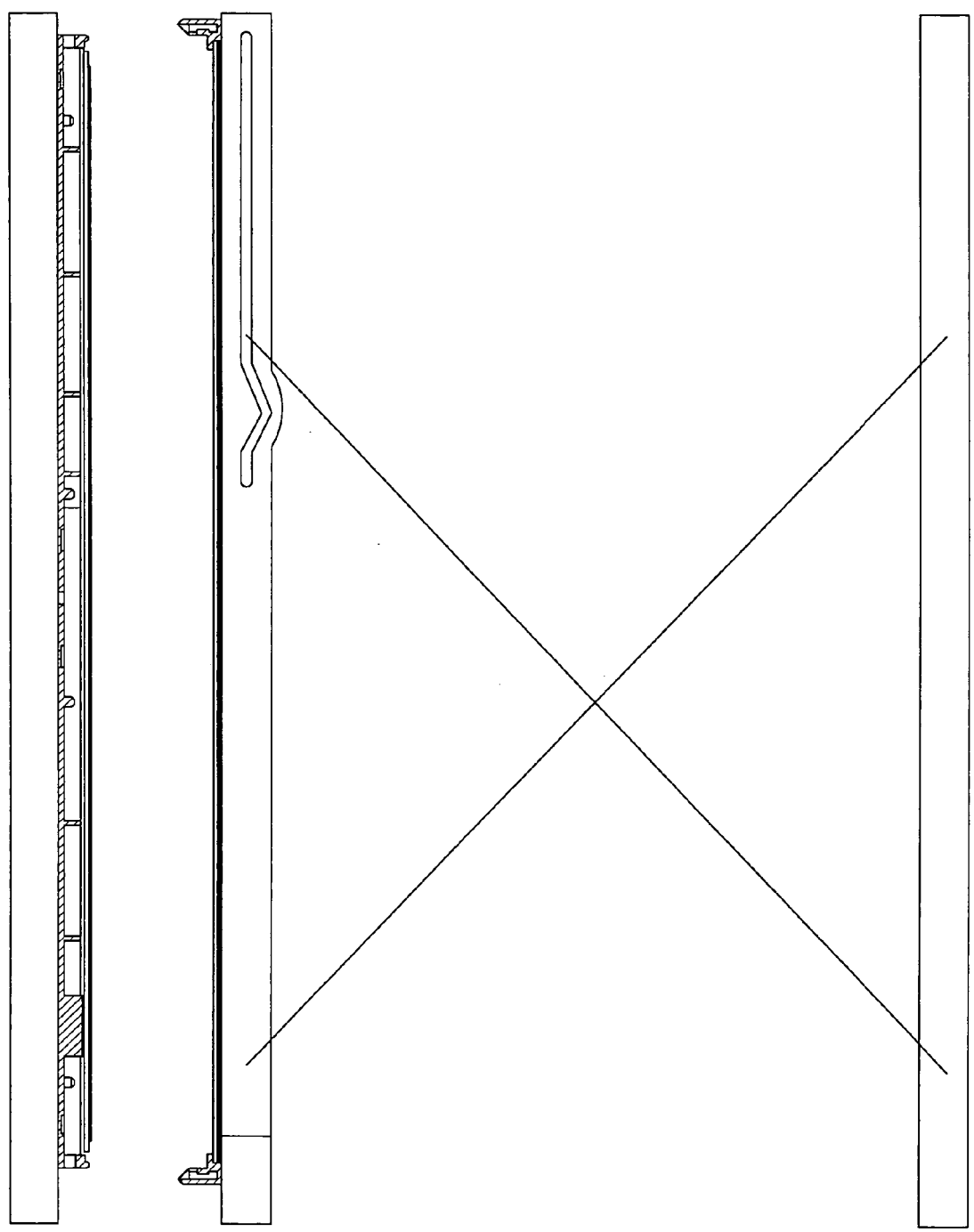

FIG. 14 to 16 each is a schematic view showing another embodiment of a cassette conveying section.

DETAILED DESCRIPTION OF THE PREFERRED EMBODIMENT

Figure 4:
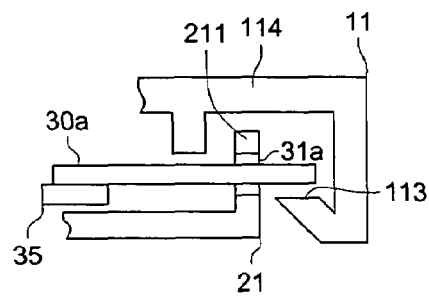
FIG. 4 is a sectional view of the cassette showing each of conditions (A) to (H) of the lock mechanism of FIG. 3.
Figure 4:
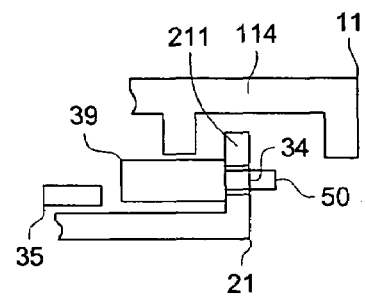
Figure 4:
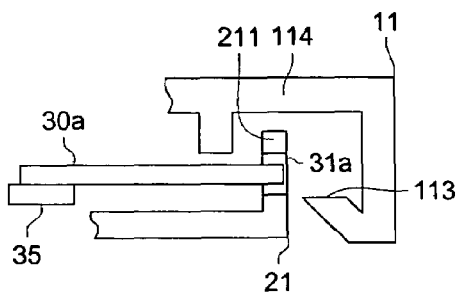
Figure 4:
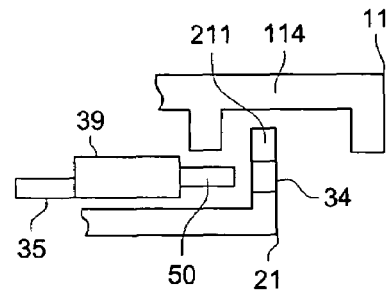
Figure 4:
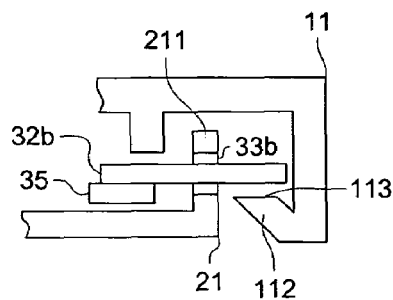
Figure 4:
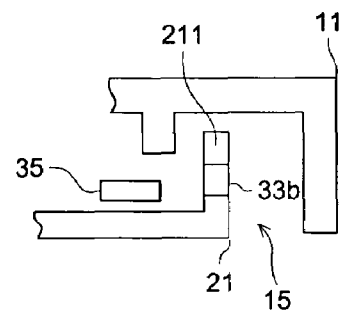
Figure 4:
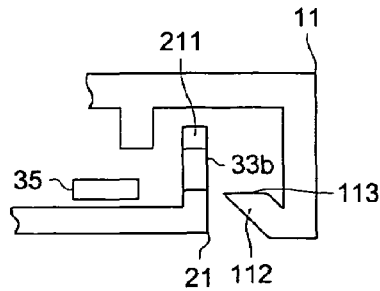
Figure 4:
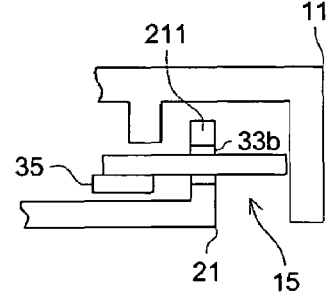
Figure 5:
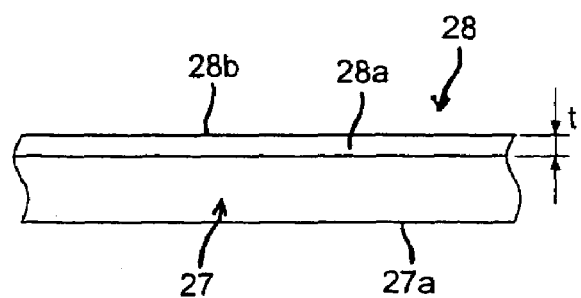
FIG. 5(A) is a schematic sectional view of an accumulative phosphor sheet accommodated in the cassette for the radiation image photographing of FIG. 1.
FIG. 5(B) is an enlarged sectional view in the vicinity of the surface of a sheet-like image recording section.
Figure 5:
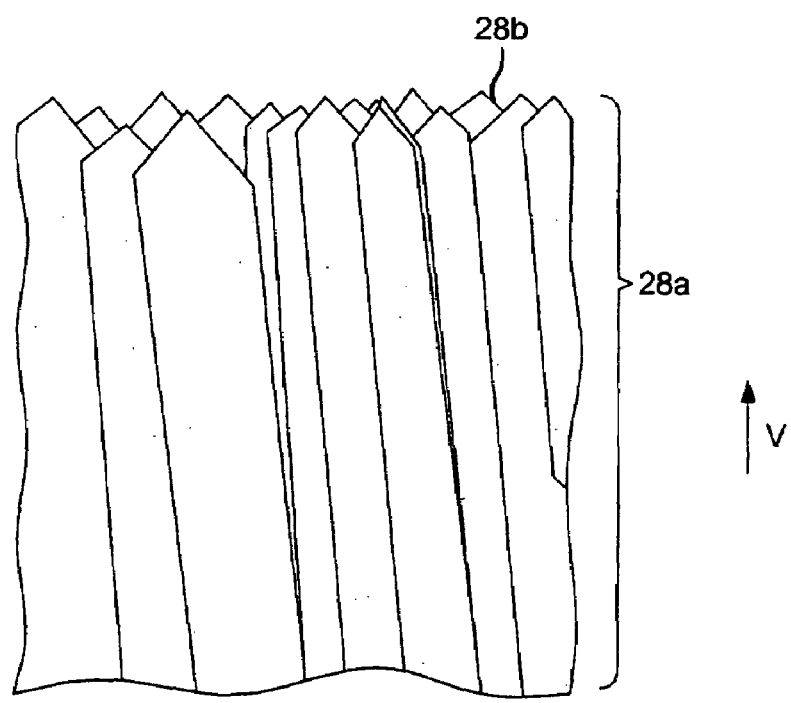

Referring to the drawings, the best mode for carrying out the invention will be described below. FIG. 1 is a perspective view showing a condition that the front member (A) and the back member (B) of the cassette for the radiation image photographing according to the present embodiment are separated. FIG. 2 is a sectional view (A) typically showing a cross section of the cassette in which the front member and the back member in FIG. 1 are integrated, and an enlarged sectional view (B) of the cassette main part. FIG. 3 is an inside surface view (A) of the back member for describing the lock mechanism of the cassette in FIG. 1 and a side surface view (B) showing a cross section of the main part. FIG. 4 is a sectional view of the cassette showing each of conditions (A) to (H) of the lock mechanism in FIG. 3. FIG. 5 is a schematic sectional view (A) of an accumulative phosphor sheet which is accommodated in the cassette for the radiation image photographing in FIG. 1 and an enlarged sectional view (B) of the vicinity of the surface of the sheet-like image recording section.

As shown in FIGS. 1 (A), (B), a cassette for the radiation image photographing (hereinafter, simply also called "cassette") 1 is structured into thin type rectangular in its entirety, by a front member 10 and a back member 20 arranged so as to oppose to the front member 10, and it is structured in such a manner that, under the condition that it is fixed to a support plate 27 of the back member 20 side, an accumulative phosphor sheet 28 can be accommodated in its inside space. The front member 10 and the back member 20 are detachable.

In the cassette 1, the radiation is irradiated from the front member 10 side, and the radiation photographing is conducted, and the radiation image can be accumulated and recorded in the accommodated accumulative phosphor sheet 28. That is, the accumulative phosphor sheet 28 has, as shown in FIG. 5(A), an accumulative phosphor layer 28a formed of accumulative phosphor formed of the needle imaging plate, for example, CsBr, and the accumulative phosphor layer 28a composes the sheet-like image recording section.

The accumulative phosphor layer 28a is formed by the deposition method by the vaporization, and is formed of the needle imaging plate by the deposition method as shown in FIG. 5(B), and a growth direction V of the needle imaging plate is extended toward a thickness direction surface 28b of the accumulative phosphor sheet 28. The average diameter of the prismatic phosphor is about 3 μm. Further, the thickness t of an accumulative phosphor layer 28a is within a range of 20 μm to 2 mm.

Hereupon, a size of the needle imaging plate of the accumulative phosphor, for example, CsBr can be controlled when the formation of the needle imaging plate by the deposition method is more accurately controlled, and a modulation transfer function (MTF) in the accumulative phosphor layer 28a can be improved, and both of higher sensitivity and high sharpness can be attained, and the accumulation and recording of the radiation image whose image quality is better, are possible.

As shown in FIG. 1(A), the front member 10 is provided with a frame member 11 of an external shape frame having a frame 17 on the short member side and a frame 18 on the long member side, and a front surface plate 13 inscribed in the inside surface of the frame member 11. As shown in FIG. 2(A), the frame member 11 has a frame front surface section 114 facing the front surface side, a frame side surface section 110 almost perpendicularly bending toward the back surface side from the end portion of the frame front surface section 114, and a frame back surface section 111 further almost perpendicularly bending toward the inside in the width direction from the end portion of the frame side surface section 110, and an inclined surface section 112 bending toward the direction of frame front surface section 114 at the inclination of a predetermined angle from the end portion of the frame back surface section 111. Further, on the rear surface of the frame front surface section 114, a light shielding protrusion 115 protruding in the same direction as the frame side surface 110 is provided.

Further, as shown in FIG. 2(A), by the space surrounded by the frame front surface section 114, frame side surface section 110, inclined surface section 112 and light shielding protrusion 115, a concave section 12 is formed inside the frame member 11. Further, as shown in FIGS. 2(C) and 2(D), a cushioning member 29 of non-woven fabric formed in a plane shape, for example, may be arranged on the inner surface side (on the back member 20 side) of the front surface plate 13 of the frame member 11.

Further, on the frame back surface section 111 and inclined surface section 112 of the frame 18 on the long member side, as shown in FIGS. 4(F), (H), a plurality of notches 15 corresponding to a plurality of lock craws on the back member 20 side are formed. Further, as shown in FIG. 1(A), FIGS. 4(B), (D), at almost the center in the longitudinal direction of the frame side surface section 110 of the frame 17 on the one short member side, a notch section 14 is provided, and a concave portion for grip 16a is respectively formed on the end portion side of the width direction of both-frame side surface section 110.

As shown in FIG. 1(B), FIG. 2(A), the back member 20 is provided with a back member main body 21, accumulative phosphor sheet 28, and a support plate 27 for supporting the accumulative phosphor sheet 28. The back member main body 21 has a back member back surface section 210, and a back member side surface section 211 almost perpendicularly bending toward the front surface side from the back member back surface section 210. Further, on the front surface of the back member back surface section 210, an inner wall 213 protruding in the same direction as the back member side surface section 211 and rib 214 are provided. Further, as shown in FIG. 2(A), in the space surrounded by the back member back surface section 210, back member side surface section 211, and inner wall 213, a concave section 22 is formed.

Figures 3A, 3B:
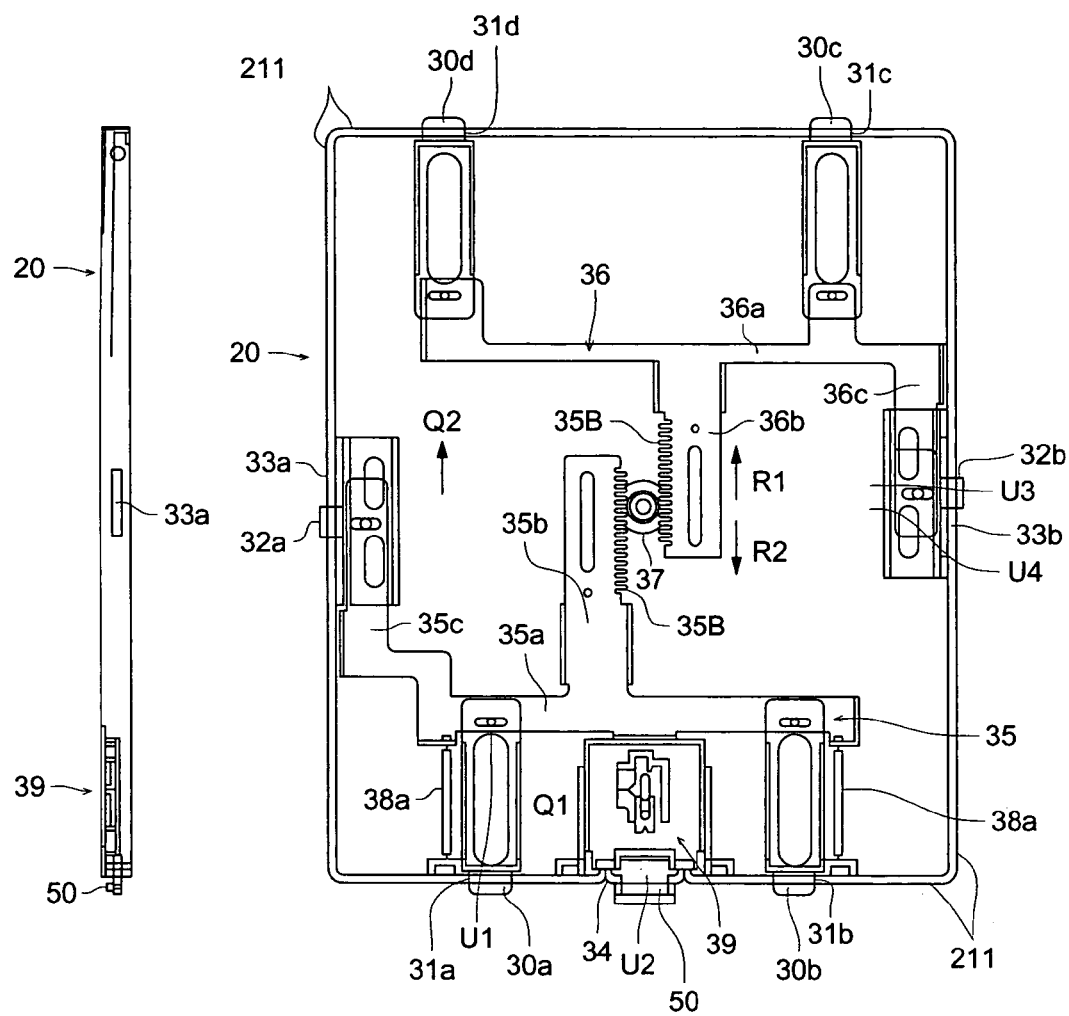
FIG. 3 is an inner surface view (A) of the back member for explaining a lock mechanism of the cassette of FIG. 1, and a side view (B) showing a main part cross section.

As shown in FIG. 1(B), FIG. 3(A), in the back member side surface section 211 on one end side of the short member direction of the cassette 1, an insertion hole 34 is formed corresponding to the notch section 14 on the front member 10 side. Further, on the longitudinal direction end portion side of the back member side surface section 211, opening sections 31a, 31b, 31c, 31d, and on the width direction end portion side of the back member side surface section 211, opening sections 33a, 33b are formed.

To the rib 214 of the back member 20, a rear plate 23 which is a structure in which, for example, a lead foil is coated on PET film, is fixed. To the rear plate 23, the support plate 27 is adhered by an adhesive double coated tape or an adhesive agent, with the strength by which re-covering can be conducted, on the opposite surface 27a of the accumulative phosphor layer 28a of FIG. 5(A), and on the front surface side of the support plate 27, the accumulative phosphor layer 28a formed by the deposition method (vaporization) as described above, is positioned. In such a manner as described above, the accumulative phosphor sheet 28 is accommodated on the back member 20 side.

In the above-described cassette 1, when the back member 20 and the front member 10 are combined as shown in FIG. 2(A), the light shielding protrusion 115 of the front member 10 enters into the concave section 22 of the back member 20, and the back member side surface section 211 of the back member 20 enters into the concave section 12 of the front member 10. By such a structure, the back member 20 and the front member 10 are integrally combined and the cassette 1 is structured, and the light shielding is conducted so that the outer light does not arrive at the accumulative phosphor sheet 28. Further, in the concave section 12 of the front member 10 or the concave section 22 of the back member 20, for example, a velvet or sponge is provided, and when it is structured so that the back member 20 and the front member 10 are in more close contact with each other, the light shielding property can be more improved.

Further, as shown in FIGS. 2(A), (B), when the front member 10 and the back member 20 is combined, it is structured in such a manner that, between the front surface plate 13 on the front member 10 side and the accumulative phosphor layer 28a of the accumulative phosphor sheet 28 on the back member 20 side, a space 29a is formed, and the distance g is within a range of 0.5 to 2 mm. Still further, as shown in FIGS. 2(C) and 2(D), a cushioning member 29 of non-woven fabric in a plane shape, for example, may be arranged on the front member 10 side in the gap g, forming a space 29a between the cushioning member 29 and the accumulative phosphor layer 28a of the accumulative phosphor sheet 28. Thus, the cushioning member 29 has no contact with the accumulative phosphor layer 28a all the time. As non-woven fabric for the cushioning member 29, a suede type, a velour type, a velour type (raising), and other various types can be employed.

In FIG. 13, a result of a glare measurement by a lead disk (80 mm diameter) conducted for the cassette structured as in FIG. 1, FIG. 2, is shown. From FIG. 13, it is found that the contrast ratio when the distance g between the front member 10 and the accumulative phosphor sheet 28 is changed, is larger as the distance g is larger, and the glare is lowered, however, the contrast ratio is not so increased up to the distance g is 2 mm. Therefore, when the distance g of the space 29a between the front member 10 and the accumulative phosphor sheet 28 is less than 2 mm, the image quality is not influenced. Further, when the distance g is more than 0.5 mm, the non-contact of the front plate 13 with the accumulative phosphor layer 28a can be comparatively easily maintained at the time of photographing or image reading processing.

Further, because the back member main body 21 is attracted and held by the magnetic force of the magnet in the radiation image reading device, which will be described later, it is preferable that the back member main body 21 itself is made a magnetic section, for the purpose of that it can be attracted to the magnet by the magnetic force, and is formed of the magnetic plastic. Further, a structure in which the back member main body 21 is formed of normal plastic, and a magnetic sheet (not shown) such as an iron foil, is provided to the rear surface 24 of the back member 20 as a magnetic section, may also be allowed. Further, to the rear surface 24 of the back member 20, the magnetic section may also be given, in such a way that the magnetic material is coated.

As described above, although the front member 10 and the back member 20 are integrated and compatible, normally, the radiation photographing is conducted under the condition that they are integrated as shown in FIG. 2(A). When the front member 10 and the back member 20 are separated and integrated, the front member 10 and the back member 20 are separate or integrated in such a manner that mutual planes are relatively separated or approached in almost the same direction as the growth direction of the needle imaging plate of the accumulative phosphor sheet 28 as shown in FIGS. 5(A), (B). Accordingly, when the front member 10 and the back member 20 are separated and integrated, even when a case where the external force is applied on the accumulative phosphor sheet 28, is caused, because it is applied not in the direction almost perpendicular to the needle imaging plate growth direction, but in the direction almost same as the growth direction of the needle imaging plate, the needle imaging plate is hardly broken. Further, even when the external force is going to be applied on the accumulative phosphor sheet 28 in the cassette 1 from the front member 10 side, because there is a distance between the front member 10 and the accumulative phosphor sheet 28, the external force is hardly applied on the needle imaging plate of the recording medium, and the needle imaging plate is hardly broken. Therefore, even when the external force is applied on the cassette when the cassette is carried, or the patient in bed is radiation-photographed by using the cassette, a bad influence on the needle imaging plate can be prevented.

Further, as shown in FIGS. 2(C) and 2(D), because the cushioning material 29 formed of non-woven fabric is arranged in a gap g between the front surface plate 13 of the front member 10 side and the accumulative phosphor layer 28a on the back member 20 side, always in non-contact manner to the accumulative phosphor layer 28a, even when the impact by the external force is applied on the cassette 1, the impact can be absorbed and softened, and the needle imaging plate is hardly broken, and the peel charging is hardly generated when the accumulative phosphor sheet 28 is taken out, and the dusts adhered to the static electricity is not generated, further, dusts are not generated from the cushioning member 29 itself, and the stress is not applied on the accumulative phosphor sheet 28, and problems such as the breakage and damage of the accumulative phosphor sheet 28, can be prevented. When the recording medium is taken out, the stress is not applied on the recording medium, and problems such as the breakage and damage of the recording medium, can be prevented.

In the manner as described above, a cassette having optimum cassette structure in which a stress does not exert on the accumulative phosphor sheet using the needle imaging plate grown by the deposition method at the most, can be realized.

Next, referring to FIG. 3, FIG. 4, a lock mechanism of the cassette 1 will be described. The cassette 1 has a lock mechanism for a purpose to maintain a condition that the front member 10 and the back member 20 are integrated. As the lock mechanism of the cassette 1, on the front member 10, a plurality of notches 15 (FIGS. 4(F), (H)) for lock craw are formed, and to the back member 20, the first connection member 35, the second connection member 36, and a pinion 37 are provided.

As shown in FIG. 3(A), the first connection member 35 has the first lateral member 35a, the first middle member 35b protruded toward the inside in the longitudinal direction of the back member 20 from a little right side at the center of the first lateral member 35a, and the first left member 35c protruded inward in the longitudinal direction of the back member 20 from the left end portion of the first lateral member 35a.

Further, the second connection member 36 has the second lateral member 36a, the second middle member 36b protruded toward the opposite side to the first middle member 35b from a little left side at the center of the second lateral member 36a, and the second left member 36c protruded inward in the longitudinal direction of the back member 20 from a right end portion of the second lateral member 36a.

The leading edge portion of the first middle member 35b and the leading edge portion of the second middle member 36b are opposite with a pinion 37 provided at almost center of the back member 20 between them, and when lack portions 35B, 36B, provided on respective leading edge side surfaces are engaged with the pinion 37, the first connection member 35 and the second connection member 36 are connected through the pinion 37.

Further, in the vicinity of each end portion of the first lateral member 35a of the first connection member 35, lock claws 30a, 30b as engaged portion are provided in such a manner that they protrude from the back member side surface section 211. Further, a lock claw 32a as the slide member, is provided toward the outside of the side surface of the first left member 35c.

Further, as shown in FIG. 3(A), two coil springs 38a whose one end is fixed to the first connection member 35, and whose other end is fixed on the inner surface side of the back member side surface section 211, are provided. By this coil spring 38a, the first connection member 35 is subjected to an energizing force to be moved always in the arrow Q1 direction.

Further, a push latch section 39 is provided between the first connection member and the back member side surface section 211 in which the insertion hole 34 is formed. The push latch section 39 has, as shown in FIG. 1(B), FIG. 3(A), a slide plate 50 protruded from the back member side surface section 211, and further, it is always subjected to the energizing force in the arrow Q1 direction by the spring (not shown).

Further, lock claws 30c, 30d as engaged section are provided so as to protrude from the back member side surface section 211 in the vicinity of the end portion of the second lateral member 36a in the second connection member 36. Further, the lock claw 32b as the slide member is provided toward the outside of the side surface of the second right member 36c.

In the present embodiment, lock claws 30a, 30b, 32a provided to the first connection member 35 are interlocked, and on the one hand, lock claws 30c, 30d, 32b provided to the second connection member 36 are interlocked. Further, because the first connection member 35 and the second connection member 36 are interlocked by the movement of the lack sections 35B, 36B, provided to the respective one, and the pinion 37, all lock claws 30a, 30b, 30c, 30d, 32a, 32b are interlocked.

In the cassette 1 in the present embodiment, a system (push latch system) in which the notch section 14 of the front member 10 is in the position relationship corresponding to the insertion hole 34 of the back member 20 when the front member 10 and the back member 20 are integrated, and every when the insertion member is inserted by the notch section 14 and the slide plate 50 is slid, and the push latch section 39 is pushed, a condition of the lock mechanism (lock-on condition/lock-off condition) is switched, is adopted. The push latch system is well known as the mechanism which is used when a core of a ball pen is taken-in and out to the ball pen sheath.

Next, referring to FIG. 3 and FIG. 4, a lock-on/off movement by the above-described lock mechanism will be described.

A lock-on condition is a condition of FIG. 4(A) in which a leading edge of lock claws 30a, 30b, 30c, 30d, which is engaged section, protrudes outside from opening sections 31a, 31b, 31c, 31d, of the back member side surface section 211, and runs in between the front surface section 114 of the front member 10 and inward surface 113 of the inclined surface section 112. In this time, the push latch section 39 is a condition of FIG. 4(B) in which the push latch section 39 is in contact with the back member side surface section 211, and is separated from the first connection member 35. Further, lock claws 32a, 32b which are slide sections, are conditions of FIGS. 4(E), (F) in which they enter between the front surface section 114 of the front member 10 and the inward surface 113 of the inclined surface section 112.

At such a lock-on condition, when the insertion member is inserted toward the arrow direction P only one time from the notch section 14, and the slide plate 50 of the push latch section 39 is pressed, the push latch section 39 pushes the first connection member 35 toward the arrow direction Q2. Then, the first connection member 35 is moved toward the arrow direction Q2 by a predetermined distance, and the push latch section 39 is stopped, and it becomes the condition in FIG. 4 (D). At this time, it becomes the condition in FIG. 4(C) in which the leading edges of lock claws 30a, 30b of the first connection member 35 enter into the inside of the back member side surface section 211. The condition of FIGS. 4(C), (D) is a lock-off condition of the lock mechanism.

Further, when the first connection member 35 is moved toward the direction of the arrow Q2, because the second connection member 36 is also moved toward the direction of arrow R2 by the same direction, and stopped, it becomes a lock-off condition of FIG. 4(C) in which the leading edges of lock claws 30c, 30d of the second connection member 36 enter into the inside of the back member side surface section 211.

At this time, the lock claw 32a of the connection member 35 and the lock claw 32b of the connection member 36 are also interlocked and moved in opening sections 33a, 33b by the same distance toward the arrow Q2 and stopped, and it becomes a condition of FIGS. 4 (G), (H). In this condition, because positions of lock claws 32a, 32b, and notch 15 (openings provided in the frame back surface section 111 and frame inclined surface section 112) coincide with each other, the lock claws 32a, 32b can slip from the notch 15. That is, it is a condition in which the back member 20 can be separated from the front member 10. This condition of FIGS. 4(G), (H) is the lock-off condition of the lock mechanism.

In the lock-off condition of the lock mechanism as shown in FIGS. 4(C), (D), (G), (H), the front member 10 and the back member 20 are separable condition, and unless the push latch section 39 is not pressed, this lock-off condition is continually maintained.

Further, at the time of lock-off condition of FIGS. 4(C), (D), when the insertion member presses the slide plate 50 of the push latch section 39 through the notch section 14, the push latch section 39 returns to the direction of arrow Q1. The first connection member 35 moves toward the direction of arrow Q1 by a predetermined distance and stops, and becomes a condition of FIG. 4(B). At this time, the leading edge of lock claws 30a, 30b, protrude outside from opening sections 31a, 31b, runs in between the frame front surface section 114 of the front member 10 and the inward surface 113 of the inclined surface section 112, and becomes a lock-on condition of FIG. 4(A). At this time, lock claws 32a, 32b are also interlocked and moved toward the direction of arrow Q1 by the same distance in the opening sections 33a, 33b, and stopped, and becomes a lock-on condition as shown in FIGS. 4(E), (F).

Further, when the first connection member 35 moves toward the direction of arrow Q1, the second connection member 36 also moves toward the direction of arrow R1 by the same distance and stops, and the leading edge of lock claws 30c, 30d protrudes outside from opening sections 31c, 31d, and runs in between the frame front surface section 114 of the front member 10 and the inward surface 113 of the inclined surface section 112, and becomes a lock-on condition of FIG. 4 (A). In this manner, the back member 20 is engaged with the front member 10, and fixed, and unless the push latch section 39 is pressed, this lock-on condition is continued and maintained.

As described above, in the cassette 1 of the present embodiment, by the push latch mechanism by which the lock-on condition/lock-off condition are switched every time of one pressing, the switching of a condition in which the back member 20 is locked with the front member 10 and a separable condition, can be simply conducted. Further, by the push latch mechanism, the lock mechanism of the cassette 1 is made a lock-off condition, and the front member 10 and the back member 20 are separated in the cassette reading processing device which will be described later, and the accumulative phosphor sheet 28 is exposed, and the radiation image information accumulated and recorded in the accumulative phosphor sheet 28 can be read.

Next, referring to FIG. 6, a modified example of the support mechanism of the accumulative phosphor sheet 28 in the cassette will be described. FIG. 6 is a sectional view (A) showing a modified example of the cassette of FIG. 2, a sectional view (B) showing a condition in which the external force is applied on the front member and it is deformed, a sectional view (C) showing a condition in which the external force is applied on the back member and it is deformed, a view (D) typically showing a deformed condition of a double-sided adhesive tape as the joining means in FIG. 6(C), and a view (E) typically showing a deformed condition of the elastic adhesive agent as the joining means in FIG. 6(C).

As shown in FIG. 6(A), the joining of the back member 20 and the accumulative phosphor sheet 28 is a joining type by which the relative movement of both is possible. As this joining means, there are a magnet, elastic adhesive agent, and double-sided adhesive tape, and for example, a magnet 20a is provided on the back member 20 side, and an iron foil 20f which is attracted to the magnet 20a, is provided on the accumulative phosphor sheet 28 side, and because, for a joining section 20c on the base 20b integrally formed with the other back member 20, the elastic adhesive agent or the double-sided adhesive tape on whose both surfaces the adhesive agent is coated, is used, the back member 20 and the accumulative phosphor sheet 28 are relatively movable.

Hereupon, by the shape of the cassette housing, in the case where the deflection direction (deformation direction) when the housing is subjected to the external force is specified, there is a case where a combination of the different joining means such as the above-described magnet 20a and the joining section 20c, is effective, however, it is of course that the same joining means (for example, the elastic adhesive agent for all) may be used.

Further, as shown in FIG. 6(A), a space 29 is formed between the inner surface of the front member 10 of the cassette and the surface of the accumulative phosphor sheet 28, and the distance g is 0.5 to 2 mm.

To the cassette of FIG. 6(A), as shown in FIG. 6(B), when the external force is applied on the front member 10 side of the cassette and it is deformed, because there is a space 29 between the front member 10 and the accumulative phosphor sheet 28, even when both come into contact with each other, it is a little, and the external force is slightly applied on the accumulative phosphor sheet 28 from the front member 10 side, and the influence of the external force is not caused. On the one hand, because the back member 20 is not deformed, the influence of the external force on the accumulative phosphor sheet 28 from the back member 20 side hardly occurs.

Further, as shown in FIG. 6(F), a cushioning member of non-woven fabric in a plane shape, for example, may be stuck on the inner surface of the front member 10 of the cassette. The cushioning member 29 maintains the state of having no contact with the surface of the accumulative phosphor sheet 28 all the time.

When an external force is applied to the cassette in FIG. 6(F) on the front member 10 side thereof and the front member 10 is deformed, as shown in FIG. 6(G), the front member 10 and the accumulative phosphor sheet 28 come closer to each other. However, the cushioning member 29 therebetween prevents contact therebetween, and the external force is absorbed and reduced. Thus, almost no stress is transferred to the accumulative phosphor sheet 28, and accordingly, the external force have no effects.

Further, as shown in FIG. 6(C), even when the external force is applied on the front member 10 and back member 20 of the cassette, and the cassette is deformed, because there is a space 29a between the front member 10 and the accumulative phosphor sheet 28, the external force is slightly applied on the accumulative phosphor sheet 28 from the front member 10 side, and the influence of the external force does not occur. Further, as shown in FIG. 6(H), in the case of sticking the cushioning member 29 of non-woven fabric in a plane shape, for example, on the inner surface of the front member 10 of the cassette, even when the front member 10 and the back member 20 of the cassette are deformed by an external force, the external force is absorbed and reduced, causing almost no stress in the accumulative phosphor sheet 28, thereby there are no effects by the external force. On the one hand, when the back member 20 and the accumulative phosphor sheet 28 relatively moved at the magnet 20a and the joining section 20c, the transmission of the external force on the accumulative phosphor sheet 28 is softened, and the influence of the external force on the accumulative phosphor sheet 28 hardly occurs. In this way, the accumulative phosphor sheet 28 is hardly broken.

In the case where the deformation of the cassette as shown in FIG. 6(C) occurs, when the joining means is compared in a point of the deformation following property, in the magnet, double-sided adhesive tape, and elastic adhesive agent, the elastic adhesive agent is most preferable, and next, the double-sided adhesive tape is preferable.

That is, when the joining section 20c of FIG. 6(C) is the double-sided adhesive tape 20d, the double-sided adhesive tape deforms mainly in the direction X as shown by a broken line, and follows the deformation of the back member 20. On the one hand, when the joining section 20c is the elastic adhesive agent 20e as shown in FIG. 6(E), the elastic adhesive agent 20e deforms while it changes the volume in the direction X and direction Y as shown by a broken line, and follows the deformation of the back member 20. Further, in the case of the magnet, it only slides the accumulative phosphor sheet 28 in the direction X and has not a function to the direction Y.

From the above description, the elastic adhesive agent 20e can follow and deform both in the direction X and direction Y, and the follow-up range is broader than the double-sided adhesive tape 20d which deforms in the direction X and hardly deforms in the direction Y, and even when the back member deforms in such a manner that the diameter is R1 as shown in FIG. 6(C), because the accumulative phosphor sheet 28 slightly deforms, and the elastic deformation is absorbed in the elastic adhesive agent 20e, it deforms in such a manner that the radius is radius R2 larger than radius R1 (R2>R1), and the accumulative phosphor sheet 28 does not deform, which is preferable.

Further, the double-sided adhesive tape 20d has a broader follow-up range than the magnet, and when the deformation radius R1 of the back member 20 is constant, the deformation radius R2 of the accumulative phosphor sheet 28 is larger than in a case of the magnet, and the accumulative phosphor sheet 28 hardly deforms.

Hereupon, also in the adhesive agent, a comparatively hard one like the instantaneous adhesive agent such as ALON α (Trade name), has a very narrow follow-up range, the deformation radius R2≈deformation radius R1, and the accumulative phosphor sheet 28 easily deforms, which is not preferable.

Figure 7:
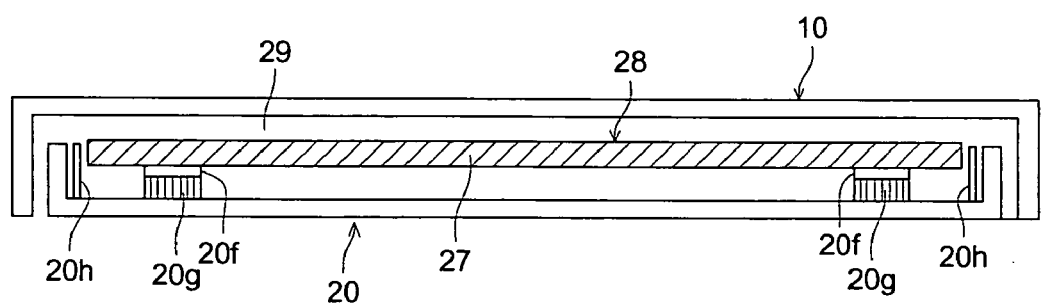
Figure 7:
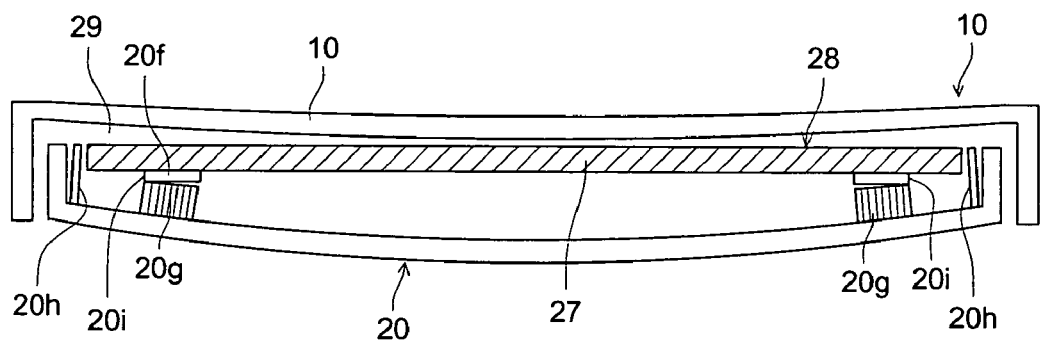
Figure 7:
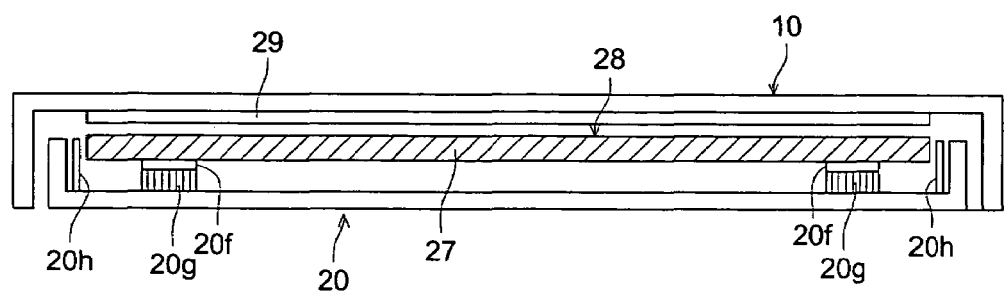
Figure 7:
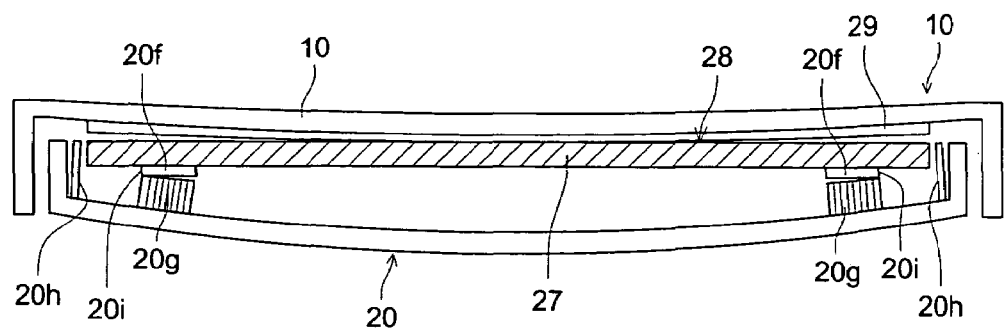

Next, referring to FIG. 7, another modified example of the support structure of the accumulative phosphor sheet 28 in the cassette will be described. FIG. 7 is a sectional view (A) showing another modified example of the cassette in FIG. 2, and a sectional view (B) of showing the condition in which the external force is applied on the back member, and it is deformed.

The joining means of the back member 20 and the accumulative phosphor sheet 28 of the cassette in FIG. 6 is the structure by which the joining area is maintained constant when the cassette is subjected to the external force and the back member is deformed, however, the joining means in FIG. 7 is structured so that its joining area becomes small when the back member 20 and the accumulative phosphor sheet 28 are relatively moved.

That is, as shown in FIG. 7(A), the back member 20 and the accumulative phosphor sheet 28 are jointed when the magnet 20g provided on the back member 29 side and the iron foil 20f provided on the accumulative phosphor sheet 28 side are attracted. Further, on the back member 20, the rib 20h as the position regulation section is integrally formed with the back member 20 so that the rib 20h comes close to the end portion of the accumulative phosphor sheet 28.

As shown in FIG. 7(B), when the back member 20 is deformed, the absorption force (magnetic force) of the magnet 20g to the iron foil 20f is set so that the magnet 20g and the iron foil 20f are separated in almost point contact condition at end portion 20i.

As shown in FIG. 7(B), when the cassette is subjected to the external force and the back member 20 is deformed, the magnet 20g is relatively moved to the iron foil 20f of the accumulative phosphor sheet 28 and separated from the iron foil 20f, and becomes almost point contact condition with the iron foil f at end portion 20i. Therefore, even when the back member 20 is deformed, because the deformation is not transmitted to the accumulative phosphor sheet 28 side, the accumulative phosphor sheet 28 can maintain the plane and is not deformed.

Further, as shown in FIG. 7(B), because there is the space 29a between the front member 10 and the accumulative phosphor sheet 28, the external force is slightly applied on the accumulative phosphor sheet 28 from the front member 10 side, and the influence of the external force does not occur. Further, as shown in FIG. 7(C) and 7(D), in the case of providing the cushioning member 29 between the front member 10 and the accumulative phosphor sheet 28, even when the front member 10 and the accumulative phosphor sheet 28 come closer to each other, contact therebetween does not occur, and also, the external force is absorbed and reduced. Therefore, almost the external force is absorbed and reduced, and almost no external force is transferred to the accumulative phosphor sheet 28, wherein the external forces has no effects.

Further, when the deformation of the back member 20 is repeated, because the accumulative phosphor sheet 28 is position-regulated at the vicinity of its end portion by the rib 20h, the position of the accumulative phosphor sheet 28 can be kept within a predetermined range to the back member 20.

As described above, the structure of FIG. 7, can keep the plane of the accumulative phosphor sheet 28 and is more preferable than that of FIG. 6, however, because there is a possibility that the absorption force (magnetic force) of the magnet 20g to the iron foil 20f is lowered, and the relative position of the back member and the accumulative phosphor sheet 28 is changed, as shown in FIG. 7, the change of relative position is prevented by the position-regulation by the rib 20h provided on the back member 20 side as shown in FIG. 7.

Next, referring to FIG. 12, yet another modified example in which a hold member formed of the cushioning material is arranged on the opposite surface side of the accumulative phosphor layer 28a of the accumulative phosphor sheet 28 in FIG. 1, FIG. 2, will be described. FIG. 12 is a sectional view showing yet another modified example in which the hold member formed of the cushioning material is arranged on the opposite surface side of the accumulative phosphor layer 28a of the accumulative phosphor sheet 28 in FIG. 1, FIG. 2.

As shown in FIG. 12, the hold member 25 is arranged facing to the inner surface of the back member 20 in such a manner that the accumulative phosphor sheet 28 is held at the periphery of the cassette outer shape end portion on the opposite surface 227a side of the accumulative phosphor layer 28a. The space 29a whose distance is 0.5 to 2 mm, is formed between the inner surface of the front member 10 and the surface of the accumulative phosphor sheet 28. The hold member 25 is formed of the cushioning material, and fixed on the back member 20 side, and positions the accumulative phosphor sheet 28 to the back member 20, and softens the external force such as the impact and vibration from the back member 20 side, onto the accumulative phosphor sheet 28. Further, because there is the space between the inner surface of the front member 10 and the surface of the accumulative phosphor sheet 28, the external force from the front member 10 side is slightly applied on the accumulative phosphor sheet 28, and the influence of the external force does not occur.

Hereupon, it can be structured in such a manner that the hold member 25 is provided on the front member 10 side, and the accumulative phosphor sheet 28 is positioned to the front member 10. Further, the hold member 25 can be formed of the cushioning material such as EPDM, chloroprene, or non-woven fabric. As this cushioning material, a material whose density is 0.05–1 g/cm$^3$, is preferable, for example, a rubber sponge whose density is 0.2±0.1 g/cm$^3$, such as EDPM or chloroprene, or a non-woven fabric whose density is 0.3±0.1 g/cm$^3$ is preferable. In using porous type as the rubber, an independent type one is preferable, and an excellent cushioning property and elasticity can be obtained. As the non-woven fabric, a fabric in which polyurethane resin is bound to polyester fiber, is used, and for example, each kind of type such as suede type, velour type, velour type (raising), can be used.

Next, referring to FIG. 8 to FIG. 11, a cassette reading processing device by which the above-described cassette for radiation image photographing is taken in, the front member 10 and back member 20 are separated, and the radiation image accumulated and recorded in the accumulative phosphor sheet 28 by the radiation photographing is read, will be described.

FIG. 8 is a side view showing a schematic structure of the cassette reading processing device, FIG. 9 is a schematic plan view of the cassette reading processing device of FIG. 8, and FIG. 10 is a main part side view for explaining the separation movement of the cassette of the cassette reading processing device. FIG. 11 is a side view for specifically explaining the rotation conveying section (holding and pivoting section) of the cassette reading processing device of FIG. 8.

As shown in FIG. 8, the device main body 2 has an insertion opening 3 of the cassette 1, exit opening 4 of the cassette 1, and two units of a cassette insertion delivery section 2a and a conveying reading section 2b. The cassette insertion delivery section 2a has a structure by which it can be simply detached from the conveying reading section 2b. Further, a vibration-insulting material such as a rubber cushion 73 is arranged between the conveying reading section 2b and the cassette insertion delivery section 2a, and the device 2 has a vibration-proof structure by which the vibration when the cassette is inserted or delivered, is hardly transmitted to the conveying reading section 2b.

Further, the sub scanning section 500 in the conveying reading section 2b and the rotation conveying section 40 of the cassette are installed on the same substrate 710. When the rubber cushion 720 is arranged between this substrate 710 and a bottom plate 700, the vibration-proof structure by which the vibration caused by the cassette insertion delivery section 2a is not transmitted to the sub scanning section 500, is realized. Further, between the upper end of the sub scanning section 500 and the device frame, not shown, the rubber cushion 74 is arranged, and the vibration-proof structure to the sub scanning section 500 is strengthened.

By such a vibration-proof structure, in the midst of reading the image information from the accumulative phosphor sheet 28 in the conveying reading section 2b, even when the device main body 2 is vibrated like a case where the cassette is inserted into the insertion opening 3, or the cassette is taken from the delivery opening 4, it can be prevented that noises due to the vibration are generated in the read image information. Further, because the sub scanning section 500 and the rotation conveying section 40 are installed on the same substrate 710, when the back member 20 is delivered from the rotation conveying section 40 to the sub scanning section 500, there is no case where the delivery position is moved. Hereby, the separation and integration operation of the front member 10 and the back member 20 can be accurately conducted.

Next, the structure and movement of the cassette reading processing device will be described. Hereupon, although, as the cassette 1, a 17×14 inch size cassette is assumed, it is not limited to this, and the image reading processing can be conducted using the plural-size cassette.

The cassette 1 in which the accumulative phosphor sheet 28 on which the radiation image photographing is conducted, is accommodated, is inserted into the insertion opening 3 as shown in FIG. 8 in the direction of arrow A1. At this time, it is inserted so that the notch section 14 of FIG. 1 of the cassette 1 and the insertion hole 34 are lower side, and the front surface plate 13 of the front member 10 faces the diagonally lower side. That is, it is inserted so that the reading surface of the accumulative phosphor sheet 28 faces obliquely lower side. When the cassette 1 is inserted into the insertion opening 3, a position of a code memory element adhered on the outer surface of the back member 20 and a position of a code reading section 45 coincide with each other, and the code recorded in the code memory element is read by the code reading section 45.

When the code reading section 45 accurately reads the code, the cassette size is detected from the read-out code, and the adjustment is started by adjusting the width of the rotation conveying section 40 to the cassette size. That is, pull-over sections 401a, 401b of FIG. 7 start the movement by adjusting it to the size of the cassette 1 in the direction of arrow M.

Next, an insertion roller 42 is operated, and the cassette 1 is taken in the device main body 2 in the direction of arrow A2 along a dotted line a. The rotation conveying section 40 is already ready at a position of a when the insertion roller 42 is operated, and receives the cassette 1 conveyed in by the insertion roller 42 from the insertion opening 3. When cassette grips 402a, 402b on an elevation table 402 (which operates along the rotation conveying section 40) catch the lower end of the cassette 1, the elevation table 402 is controlled so that it conveys the cassette 1 to the direction of arrow A2 along the rotation conveying section 40, and the upper end of the cassette 1 is stopped at the position shown by the arrow Z. At this conveyance, the surface facing downward of the cassette 1 is guided by the guide section 430 in FIG. 11 and supported.

When the cassette 1 is stopped at the position shown by arrow Z, the leading edge of grip claws 403a, 493b is inserted into the recess of the concave section 16a for the grip existing on the side surfaces 110 of both front members of FIG. 1, and the front member 10 is fixed to the rotation conveying section 40 and made a holding condition.

The rotation conveying section 40 has a rotation shaft 404, and can be freely rotated around this rotation shaft 404 at least in the range from a dotted line a to a dotted line c. When the cassette 1 is taken in the device main body 2 by the rotation conveying section 40, the rotation conveying section 40 is rotated when a gear 440 is rotated by a motor (illustration is omitted) and fixed to the rotation conveying section 40, and when a gear section 450 engaged with the gear 440 is rotated around the rotation shaft 404, it is rotated from a position of a dotted line a to a position of a dotted line c in the direction of arrow A3.

When the rotation conveying section 40 is rotated to a position of a dotted line c of FIG. 8, the outer surface of the back member 20 of the cassette 1 having a magnetic agent is brought into contact with the magnet 540, further, the gear 440 of FIG. 11 is still rotated, and the rotation conveying section 40 rotates the cassette 1 by a predetermined amount in the counter clockwise direction of FIG. 11. Hereby, when the cassette 1 is pressed to the magnet 540 from the front member 10 side to the back member 20 side through the guide member 430 and the elastic member 430a, the back member 20 is attracted to the magnet 540 and assuredly held. Further, because the back member 20 has a proper amount of flexibility, when it is attracted to the surface of the magnet 540, its follows the planarity of the magnet 540. As described above, when the back member 20 of the cassette 1 is made to follow the surface of the magnet 540 of the device side and brought into close contact with it two-dimensionally, the distance between the surface of phosphor and the optics can be assuredly maintained at the time of sub scanning.

On the elevation table 402, a lock pin (insertion member) 402c for turning on/off the lock mechanism of the cassette 1 is arranged, and when the lock pin 402c is vertically moved, the lock mechanism of the cassette 1 can be turned on/off. Further, the upper end (upper side reference position Z) of the cassette 1 is structured in such a manner that, for the purpose to detect the upper edge or side edge of the cassette 1 at the time of sub scanning, the upper edge of the cassette 1 protrudes to an upper side than a sub scanning moving plate 530 of the sub scanning section 500.

When the back member 20 is attracted to the magnet 540, the lock pin 402c accommodated in the elevation table 402 moves upward, and the leading edge of the lock pin 402c is inserted into an insertion hole 34 of the back member 20 through the notch section 14 of the front member 10 of FIG. 1 (refer to FIG. 9). By this movement, the lock of the cassette 1 which is in a lock-on condition, is released, and moved to a lock-off condition. That is, it becomes a condition that the back member 20 and the front member 10 can be separated from each other. When the cassette 1 is moved to a lock-off condition, the lock pin 402c is lowered, and accommodated again in the elevation table 402.

When the lock of the cassette 1 is released and moved to a lock-off condition, the rotation conveying section 40 is rotated toward the direction of an arrow A6 when the gear 440 is inversely rotated, and for example, stopped at a waiting position of a dotted line b of FIG. 8. By this operation, the back member 20 and the front member 10 are perfectly separated.

As shown in FIG. 10, when the back member 20 and the front member 10 is perfectly separated, and the rotation conveying section 40 stops at the spiral position, and the front member 10 is evacuated at an enough angle from the back member 20, it can be prevented that the back member 20 and the front member 10 interfere with each other when the back member 20 conducts a sub-scanning operation.

As described above, when the back member 20 is perfectly separated from the front member 10, the drive section (illustration is omitted) is operated, and the back member 20 is conveyed (sub scanning) to the direction of an arrow A4 (upward). During this movement of the sub scanning, the accumulative phosphor sheet 28 is main-scanned in the direction perpendicular to the sub scanning direction by the laser light B projected from a laser scanning unit 121.

When the laser light acts on the accumulative phosphor sheet 28, the stimulative light (image information) proportional to the radiation energy accumulated in the accumulative phosphor sheet 28 is radiated, and after this stimulative light is collected into the converging tube 123 through the light guide 122, the stimulative light is converted into an electric signal by a photoelectric conversion element (illustration is omitted) such as a photo-multiplier. After, on the stimulative light converted into an electric signal, a predetermined signal processing as the image data is conducted, it is outputted to the image output device (not shown) which is an another device.

In the manner as described above, when the reading of image information from the accumulative phosphor sheet 28 is completed, the drive section (illustration is omitted) starts the conveyance to the direction of arrow A5 (downward) of the back member 20 as shown in FIG. 8. While the back member 20 is conveyed to the direction of arrow A5, the erase light E is emitted from the erase means 124, and the image information remained in the accumulative phosphor sheet 28 is deleted.

Next, at the time point when the back member 20 is lowered at the position delivered to the magnet 540, the drive section (illustration is omitted) stops the movement of the back member 20 by the sub scanning section 500. When the back member 20 stops at the position delivered to the magnet 540, the rotation conveying section 40 evacuated at the shunt position is rotated again to the position of the dotted line c, and the back member 20 and the front member 10 are integrated. When the back member 20 and the front member 10 are integrated, the lock pin 402c accommodated in the elevation table 402, rises, and the leading edge of the lock pin 402c is inserted into the insertion hole 34 through the notch section 14 of the front member 10. By this movement, a lock works on the cassette 1 which is in a lock-off condition, and the cassette 1 is moved to a lock-on condition. The back member 20 and the front member 10 becomes un-separable condition. When the cassette 1 is moved to the lock-on condition, the lock pin 40 is lowered, and accommodated again in the elevation table 402.

As described above, the cassette 1 in which the back member 20 and the front member 10 are integrated, and made the lock-on, is in a condition that the back member 20 is attracted to the magnet 540, however, the rotation conveying section 40 starts the rotation to the direction of an arrow A6 in FIG. 6, and the cassette 1 can be separated easily and without deflection, from the magnet 540 against the attraction force by the magnet 540.

Next, the rotation conveying section 40 holding the cassette 1 is rotated to the position of a dotted line b and stopped. When the rotation conveying section 40 stops at the position of a dotted line b, the fixed holding condition of front member 10 by grip claws 403a, 403b is released, and the cassette 1 becomes a condition that it can be conveyed on the rotation conveying section 40.

When the fixed holding condition of the front member 10 is released, the elevation table 402 conveys the cassette 1 to the delivery opening 4 in the direction of an arrow A7, and delivers the cassette 1 to the delivery roller 43. When the delivery roller 43 receives the cassette 1, it conducts the delivery motion until the cassette 1 is perfectly delivered to the delivery opening 4. When the cassette 1 is perfectly delivered to the delivery opening 4, the rotation conveying section 40 is rotated to the position of a dotted line a in the direction of an arrow A6, and is stopped, and moved to a condition that it can receive the next cassette 1.

In a manner as described above, in the cassette reading processing device shown in FIG. 8 to FIG. 11, the accumulative phosphor sheet 28 in the cassette 1 is taken out by the non-contact system, and the reading of the radiation image information is conducted, and it is returned in the cassette again, and can be accommodated again. According to the cassette 1 in such a cassette reading processing device, when the front member 10 and the back member 20 are separated from each other, the front member 10 and the back member 20 are separated in such a manner that they are relatively separated in almost the same direction as the thickness direction of the accumulative phosphor sheet 28 (growth direction of the needle imaging plate), and for example, as shown in FIG. 8, the back member 20 of the cassette 1 is rotated from the position of a dotted line a in the direction of an arrow A3 making the rotation axis 404 a rotation center to the front member 10, and also when the front member 10 and the back member 20 are integrated, because it is rotated in the same manner, even when a case where the external force is applied on the accumulative phosphor sheet 28, occurs, it is not in the direction almost perpendicular to the needle imaging plate growth direction, but, applied almost in the same direction as the growth direction of the needle imaging plate, therefore, the needle imaging plate is hardly broken. In this manner, the cassette 1 having the optimum cassette structure for the recording medium using the needle imaging plate grown by the deposition method, can be used in the cassette reading processing device shown in FIG. 8 to FIG. 11.

Further, when the cassette 1 is attracted to the magnet 540 on the back member 20 side for reading processing, because the cassette 1 is brought into contact with the magnet 540 and further, is rotated a predetermined amount, the back member 20 can be assuredly attracted to the magnet 540, and held, and because the distance between the object and image can be assured at the time of sub scanning when the image information is read from the accumulative phosphor sheet 28, the image becomes stable.

Further, because the cassette 1 can be assuredly held to the magnet 540 by the back member 20, and the front member 10 and the back member 20 in the cassette 1 can be integrally combined by the lock claw, the cassette position is always fixed and there is no case where it becomes relatively free, and the cassette 1 can be accurately positioned in the device.

Further, when the cassette 1 is brought into contact with the magnet 540 and further, rotated by a predetermined amount, because there is the space 29 between the front member 10 and the accumulative phosphor sheet 28, the external force hardly acts on the accumulative phosphor sheet 28 in the cassette from the front member 10 side, and the external force is hardly applied on the needle imaging plate, and the needle imaging plate is hardly broken. Further, in the case where the predetermined amount when the cassette 1 is brought into contact with and rotated, is made almost the same amount as the distance g of the space 29, when the cassette 1 is brought into contact with the magnet 540, even when the front member 10 is deformed, a possibility that the accumulative phosphor sheet 28 is pressed, can be reduced. Further, as described above, when the cassette 1 is brought into contact with the magnet 540, even when the force is applied on the front member 10 from the rotation conveying section 40 side, the front member 10 is deformed a little as follows this, however, because there is the above-described space 29, the influence does not occur on the accumulative phosphor sheet 28.

Still further, as shown in FIG. 2(D), in the case of arranging the cushioning member 29 in the gap g in the cassette 1 in such a manner that the cushioning member 29 has no contact with the accumulative phosphor layer 28a all the time, shock by an external force is absorbed and reduced to cause no stress in the accumulative phosphor sheet 28. Therefore, the column crystal is hardly broken. Also, even in the operation of reading the radiation image information by the image reading device shown in FIGS. 7 to 9, taking out the accumulative phosphor sheet 28 in the cassette 1, and then housing the accumulative phosphor sheet 28 back into the cassette, almost no static electricity by separation charging is generated so that dusts are not absorbed, or dusts are not generated from the cushioning member 29, which prevents image defects which could be caused by absorption and generation of dusts, for example.

Next, another embodiment different from the cassette conveying section explained in the cassette reading processing apparatus explained in FIGS. 8 to 11 will be explained hereinafter. That is, the cassette reading processing apparatus explained in FIGS. 8 to 11 is the pivoting conveying section 40 structured such that the pivoting conveying section 40 holds the cassette inserted in a diagonally lower direction and pivots the cassette around the pivot axis. However, the cassette conveying section of the present invention is not limited to the pivoting conveying section 40. For example, the cassette conveying section may be structured such that the cassette conveying section holds the cassette inserted in a vertically lower direction, shift it in a horizontal direction while keeping it on the vertical condition, and bring it in contact with the attracting section.

FIGS. 14 to 16 shows an embodiment of a conveying section 600 to shift a cassette in a horizontal direction while keeping it on the vertical condition. As shown in FIG. 14, the conveying section 600 comprises a retractable means 610. When the cassette is inserted in a vertically lower direction, a holding member holds a front member of the inserted cassette. Then, the retractable means 610 extends so as to shift the cassette toward the attracting section in a horizontal direction and bring the cassette in contact with the attracting section, as shown in FIG. 15. Thereafter, the retractable means 610 further extends toward the attracting section by a predetermined distance as same as the abovementioned example and press the back member onto the attracting section so as to hold surely the back member with a proper flatness. Next, as same as the abovementioned example, a lock pin is actuated so as to release the locking between the front member and the back member. And then, the retractable means 610 contracts to separate the front member from the back member as shown in FIG. 16 and the attracting section is conveyed together with the back member toward the reading section. The following operations are the same as the abovementioned example.

As stated above, it is possible to convey the cassette in a horizontal direction while keeping it on the vertical condition and the cassette conveying means is not limited to the retractable means 610.

In the manner as described above, it becomes possible that the cassette 1 in which the recording medium formed of the needle imaging plate grown by the deposition method is accommodated, is optimally handled in the reading processing device.

Hereupon, in the case where the rigidity of the cassette 1 is further necessary, when the frame body of the front member 10 is composed of extruded pieces of aluminum, and a reinforcing block is provided at a corner or straight line portion, the rigidity can be enhanced, and the torsion deformation can be prevented when the carbon material is adhered.

As described above, the best mode for carrying out the present invention is described, however, the present invention is not limited to this, and various kinds of modifications can be conducted in the scope of technical idea of the present invention. For example, the number of lock claws can be appropriately changed, and for example, in FIG. 3(A), claws may be added to the side surface of the longitudinal direction of the view one by one, and a pair of claws may be provided to the side surface of the longitudinal direction one by one pair.

Further, as the accumulative phosphor of the accumulative phosphor sheet 28, in the present embodiment, CsBr is used, however, the present invention is not limited to this, but, the other accumulative phosphors may also be used, and the accumulative phosphor whose mother body is halide alkali expressed by the following general expression (1), may be used. These accumulative phosphors can be formed into the needle imaging plate by the deposition method such as the evaporation method, spattering method, CVD method, ion plating method.

$$\text{General expression: } M^1X.aM^2X'_2.bM^3X''_3: eA \quad (1)$$

In the above expression (1), M1 is at least 1 kind of alkali metallic atom selected from each atom of Na, K, Rb and Cs, M2 is at least one kind of bivalent metallic atom selected form each atom of Be, Mg, Ca, Sr, Ba, Zn, Cd, Cu and Ni, M3 is at least one kind of trivalent metallic atom selected from each atom of Sc, Y, La, Ce, Pr, Nd, Pm, Sm, Eu, Gd, Tb, Dy, Ho, Er, Tm, Yb, Lu, Al, Ga, and In, X, X', X'' are at least one kind of halide atom selected from each atom of F, Cl, Br, and I, A is at least one kind of metallic atom selected from each atom of Eu, Tb, In, Cs, Tm, Dy, Pr, Ho, Nd, Yb, Er, Gd, Lu, Sm, Y, Tl, Na, Ag, Cu, and Mg, and further, a, b, e are respectively $0 \leq a < 0.5$, $0 \leq b < 0.5$, $0 \leq b < 0.5$, $0 < e \leq 0.2$.

What is claimed is:

1. A cassette to record a radiation image of an object, comprising:
   a sheet-shaped recording medium including a support plate and a needle imaging plate layer which has a thickness of 20 μm to 2 mm and which is formed by deposition such that needle-shaped crystals of the needle imagine plate layer stand on the support plate;
   a front member through which the recording medium receives the radiation image of the object; and
   a back member positioned opposite to the front member;
   wherein the front and back members are attachable to each other a such that when the front and back members are attached an accommodation space in which the sheet-shaped recording medium is accommodated is formed between the front and back members, and the front and back members are detachable from each other so as to open the accommodation space, and wherein a direction of attaching and detaching the front and back members to and from each other is substantially the same as a growing direction of the needle imaging plate.

2. The cassette of claim 1, wherein the needle-shaped crystals stand from a first side of the support plate in a direction substantially perpendicular to a the first surface, and a second side of the support plate is mounted on the back member to form one body.

3. The cassette of claim 1, wherein the front and back member are jointed in such a way that the front and back member are relatively shiftable from each other.

4. The cassette of claim 1, wherein a distance between an inner surface of the front member and a top surface of the recording medium is 0.5 mm to 2 mm when the front and back members are attached.

5. The cassette of claim 1, further comprising a buffer member provided between the front member and the recording medium so as not to contact the recording medium.

6. The cassette of claim 5, wherein a distance between an inner surface of the front member and a top surface of the recording medium is 0.5 mm to 2 mm when the front and back members are attached, and a thickness of the buffer member is smaller than the distance between the inner surface of the front member and the top surface of the recording medium.

7. The cassette of claim 5, wherein the buffer member comprises a non-woven fabric.

8. The cassette of claim 1, further comprising a holding member which is made of a buffer material and which holds the recording medium so as to position the recording medium with respect to a periphery of the cassette.

9. The cassette of claim 8, wherein the holding member is coupled to the back member so as to position the recording medium with respect to the back member.

10. The cassette of claim 8, wherein the holding member is coupled to the front member so as to position the recording medium with respect to the front member.

11. A reading apparatus for reading radiation image information from a cassette on which a radiation image of an object has been recorded, wherein the cassette comprises: (i) a sheet-shaped recording medium including a support plate and a needle imaging plate layer which has a thickness of 20 μm to 2 mm and which is formed by deposition method such that needle-shaped crystals of the needle image late layer stand on the support plate; (ii) a front member through which the recording medium receives the radiation image of the object; and (iii) a back member positioned opposite to the front member; wherein the front and back members are attachable to each other such that when the front and back members are attached an accommodation space in which the sheet-shaped recording medium is accommodated is formed between the front and back members, and the front and back members are detachable from each other so as to open the accommodation space, wherein a direction of attaching and detaching the front and back members to and from each other is substantially the same as a growing direction of the needle imaging plate; wherein a distance between an inner surface of the front member and a top surface of the recording medium is 0.5 mm to 2 mm; and wherein when the front and back members are attached so as to be one body, the front and back members are lockable together with a locking member, the reading apparatus comprising:
   a cassette holding and transporting device to hold and transport the cassette from a first position to a second position; and
   an attracting section to attract a back member side of the cassette at the second position;
   wherein the cassette holding and transporting device transports the cassette to come in contact with the attracting section, thereafter further transports the cassette toward the attracting section by a predetermined distance, releases the locking member, and moves along a direction extending from the front member to the back member so as to separate the back member from the front member to read the radiation image information recorded in the recording medium.

12. The reading apparatus of claim 11, wherein the cassette holding and transporting device is pivotable about an axis while holding the cassette.

13. The reading apparatus of claim 11, wherein after the cassette comes in contact with the attracting section, the predetermined distance that the cassette holding and transporting device transports the cassette toward the attracting device is substantially equal to the distance between the inner surface of the front member and the top surface of the recording medium.

14. The reading apparatus of claim 13, wherein the cassette holding and transporting device is pivotable about an axis while holding the cassette.

15. The reading apparatus of claim 11, wherein after the radiation image information recorded in the recording medium is read, the front and back members are reattached to be combined in the one body, locked with the locking member, and detached from the attracting section.

16. The reading apparatus of claim 11, wherein a buffer member is provided between the front member and the recording medium so as not to contact the recording medium, and a thickness of the buffer member is smaller than the distance between the inner surface of the front member and the top surface of the recording medium.

17. A reading method of reading radiation image information from a cassette on which a radiation image of an object has been recorded, wherein the cassette comprises: (i) a sheet-shaped recording medium including a support plate and a needle imaging plate layer which has a thickness of 20 μm to 2 mm and which is formed by deposition method such that needle-shaped crystals of the needle image plate layer stand on the support plate; (ii) a front member through which the recording medium receives the radiation image of the object; and (iii) a back member positioned opposite to the front member; wherein the front and back members are attachable to each other such that when the front and back members are attached an accommodation space in which the sheet-shaped recording medium is accommodated is formed between the front and back members, and the front and back members are detachable from each other so as to open the accommodation space, wherein a direction of attaching and detaching the front and back members to and from each other is substantially the same as a growing direction of the needle imaging plate; wherein a distance between an inner surface of the front member and a top surface of the recording medium is 0.5 mm to 2 mm; and wherein when the front and back members are attached so as to be one body, the front and back members are lockable together with a locking member, the reading method comprising:

holding and transporting the cassette toward an attracting section; and further transporting the cassette by a predetermined distance toward the attracting section after bringing the cassette in contact with the attracting sections;

releasing the locking member and separating the front member from the back member; and reading the radiation image information from the recording medium while the back member is attracted by the attracting section.

18. The reading method of claim 17, wherein after the cassette comes in contact with the attracting section, the predetermined distance that the cassette is transported toward the attracting section is substantially equal to the distance between the inner surface of the front member and the top surface of the recording medium.

19. The reading method of claim 17, wherein after the radiation image information recorded in the recording medium is read, the front and back members are reattached to be combined in the one body, locked with the locking section, and detached from the attracting section.

20. The reading method of claim 17, wherein a buffer member is provided between the front member and the recording medium so as not to contact the recording medium, and a thickness of the buffer member is smaller than the distance between the inner surface of the front member and the top surface of the recording medium.

21. The reading method of claim 17, wherein the cassette is transported by a pivoting movement.

\* \* \* \* \*